(12) United States Patent
Komeno et al.

(10) Patent No.: US 7,164,453 B2
(45) Date of Patent: Jan. 16, 2007

(54) DISPLAY DEVICE

(75) Inventors: Hitoshi Komeno, Mobara (JP); Kouichi Anno, Mobara (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 11/154,566

(22) Filed: Jun. 17, 2005

(65) Prior Publication Data

US 2005/0231678 A1 Oct. 20, 2005

Related U.S. Application Data

(63) Continuation of application No. 11/148,165, filed on Jun. 9, 2005, which is a continuation of application No. 10/754,557, filed on Jan. 12, 2004, now Pat. No. 6,912,036, which is a continuation of application No. 10/235,890, filed on Sep. 6, 2002, now Pat. No. 6,710,839.

(30) Foreign Application Priority Data

Sep. 28, 2001 (JP) ............................. 2001-300800
Nov. 14, 2001 (JP) ............................. 2001-349139

(51) Int. Cl.
*G02F 1/1343* (2006.01)

(52) U.S. Cl. .......................................... 349/39; 349/38

(58) Field of Classification Search .................. 349/39, 349/38, 149, 139
See application file for complete search history.

(56) References Cited

U.S. PATENT DOCUMENTS

| 5,162,901 | A | 11/1992 | Shimada et al. |
|---|---|---|---|
| 5,852,480 | A | 12/1998 | Yajima et al. |
| 5,995,189 | A | 11/1999 | Zhang |
| 6,211,534 | B1 | 4/2001 | Matsumoto |
| 6,268,894 | B1 * | 7/2001 | Aoki et al. .................... 349/39 |
| 6,323,930 | B1 | 11/2001 | Higuchi et al. |
| 6,411,346 | B1 * | 6/2002 | Numano et al. .............. 349/39 |
| 6,532,055 | B1 | 3/2003 | Oishi |
| 6,747,723 | B1 | 6/2004 | Hanakawa et al. |

FOREIGN PATENT DOCUMENTS

| JP | 56-109390 | 2/1980 |
|---|---|---|
| JP | 59-216184 | 5/1983 |
| JP | 03-215834 | 1/1990 |
| JP | 07-36061 | 7/1993 |
| JP | 10-228033 | 2/1997 |

\* cited by examiner

*Primary Examiner*—Toan Ton
*Assistant Examiner*—David Chung
(74) *Attorney, Agent, or Firm*—Reed Smith LLP; Stanley P. Fisher, Esq.; Juan Carlos A. Marquez, Esq.

(57) ABSTRACT

Even when gate lines are pulled around at both left and right picture frame regions, it is possible to prevent a gate wiring pattern which is constituted of the gate lines and gate-line pull-around lines and a storage wiring pattern which is constituted of storage lines and a common line which connects storage lines each other from getting over each other. The gate lines GL1, GL2 are pulled around by the gate-line pull-around lines GLL1, GLL2 in both left and right picture frame regions. The common lines B2, B3 which connect the storage lines STL each other are formed at both left and right picture frame regions. Further, the gate wiring pattern which is constituted of the gate lines GL1, GL2 and the gate-line pull-around lines GLL1, GLL2 and the storage wiring pattern which is constituted of the storage lines STL and the common lines B2, B3 do not cross each other.

20 Claims, 17 Drawing Sheets

DISPLAY DEVICE

This application is a Continuation application of U.S. application Ser. No. 11/148,165 filed on Jun. 9, 2005, which is a Continuation application of U.S. application Ser. No. 10/754,557 filed on Jan. 12, 2004 now U.S. Pat. No. 6,912,036, which is a Continuation application of U.S. application Ser. No. 10/235,890 filed on Sep. 6, 2002 now U.S. Pat. No. 6,710,839. Priority is claimed based upon U.S. application Ser. No. 11/148,165 filed on Jun. 9, 2005, which claims the priority date of U.S. application Ser. No. 10/754,557 filed on Jan. 12, 2004, which claims the priority date of U.S. application Ser. No. 10/235,890 filed on Sep. 6, 2002, which claims the priority date of Japanese Application Nos. 2001-300800 and 2001-349139 filed on Sep. 28, 2001 and Nov. 14, 2001, respectively, and which is hereby incorporated by reference.

BACKGROUND OF THE INVENTION

The present invention relates to a display device, and more particularly to an active matrix type display device which forms a matrix array by making gate lines and data lines cross each other on one of two substrates and includes storage lines which constitute storage capacities for holding lighting of pixels.

Liquid crystal display devices have been widely used as display devices of notebook type personal computers, various monitors or various other information equipment. Particularly, as display devices of portable telephone sets or portable information terminals referred to as PDA, the liquid crystal display devices have been used in view of characteristics thereof that the devices are small in size and light-weighted and exhibit the low power consumption. Further, the liquid crystal display devices each of which directly mounts a driving circuit chip on a portion of the substrate thus realizing the miniaturization as a whole have been spreading as a main stream.

In many cases, the liquid crystal display device which is adopted by this type of portable information terminal is constituted to supply display data and driving voltages from one side of two laminated substrates in view of the reduction of mounting space and easiness of mounting of a control circuit. Particularly, the liquid crystal display device for portable telephone set adopts, in many cases, a method in which a flexible printed circuit board is mounted on one side of two substrates for supplying display data and other driving voltages for facilitating the accommodation of parts in a limited mounting space.

Although various types of liquid crystal display devices have been known depending on the constitution of electrodes and driving methods, here, a liquid crystal display device which is generally referred to as a TN type is explained as an example. In this TN type liquid crystal display device, a display region is formed by sealing liquid crystal in a gap defined by laminating a first substrate and a second substrate which constitute a pair of substrates. On the display region of the first substrate, a matrix is constituted of a large number of data lines (also referred to as drain lines, signal lines or the like) which extend in the longitudinal direction (referred to as first direction hereinafter) and are arranged in parallel in the lateral direction (referred to as second direction hereinafter) and a large number of gate lines (also referred to as scanning lines or the like) which extend in the lateral direction which crosses the data lines at a right angle and are arranged in parallel in the longitudinal direction, and a pixel is formed in a region surrounded by a pair of data lines and a pair of scanning lines.

The second substrate includes counter electrodes which face pixel electrodes in an opposed manner and are served for applying an electric field to the liquid crystal of the pixel. In color display, the second substrate also usually includes color filters of three colors. Each pixel is formed of the liquid crystal which is sandwiched between the pixel electrode provided to the first substrate and the counter electrode provided to the second substrate and lighting/non-lighting of the pixel is controlled by turning on/off a switching element (typically a thin film transistor; TFT, referred to as thin film transistor hereinafter) formed at a corner of the pixel.

To hold a voltage of display data when the thin film transistors which constitute these pixels are turned on for a given period, storage capacities (Cstg) are provided to respective pixels. Although various methods have been known as methods for supplying electricity to these storage capacities (that is, storing charge of display data supplied to the pixels and holding the charge for a given period), there has been known a method which provides lines referred to as storage lines in a display region. These storage lines are usually formed close to and parallel to respective gate lines on the first substrate.

In plane, on the display region, the storage lines are alternately positioned between the scanning lines and extend in the direction parallel to the extension direction of the scanning lines. Further, the storage lines have one ends thereof connected to a common line and the common line is pulled around to be connected to a given terminal formed on one side of the substrate. Conventionally, mounting of gate lines and storage lines in this type of liquid crystal display device has been performed in a following manner. Here, the explanation is made assuming a liquid crystal display device which is configured such that a driving circuit mounting region, that is, a driving circuit chip mounting region is provided to the first substrate, the second substrate overlaps a portion of the first substrate except for the driving circuit mounting region, and a periphery of the overlapped portion is sealed with a sealing member. Further, the explanation is made assuming that the above-mentioned driving circuit mounting region is arranged at the longitudinally lower side (lower side) of the liquid crystal display device. Accordingly, two sides of the first substrate which are disposed adjacent to the lower side of the first substrate having the driving circuit mounting region are referred to as a left side and a right side.

When the data lines are formed in the first direction (longitudinal direction, for example) of one substrate (the above-mentioned first substrate, also referred to as a thin film transistor substrate) of the liquid crystal display device which is constituted by laminating two substrates, the gate lines are formed in the second direction (lateral direction, for example) which cross the data lines at a right angle. The gate lines are extended along one side (left side, for example) in the lateral direction, that is along the left side of the substrate, for example and are pulled out to the above-mentioned driving circuit mounting region. On the other hand, the storage lines are formed between the above-mentioned respective gate lines and are pulled out to the above-mentioned driving circuit mounting region along the other side (right side, for example) in the lateral direction, that is, the right side of the substrate by way of the common line.

However, when the gate lines are pulled out at only one side (only a picture frame region at the left side, for example) as in the case of the prior art, the width of the left-side picture frame region and the width of the right-side picture frame region differ from each other and hence, the display region is arranged such that the display region is offset to the right from the lateral center position on the substrate.

Accordingly, by dividing the gate lines into a group of gate lines which is pulled out from the left-side picture frame region and is extended in the direction toward the lower side and a group of gate lines which are pulled out from the right-side picture frame region and is extended toward the lower side and, thereafter, by pulling out these gate lines using both of left and right picture frame regions, the display region can be arranged at the center position in the lateral direction. However, in such an arrangement, when the common line to which a plurality of storage lines are connected in the conventional manner is provided to only one side (for example, only right-side picture frame region), the storage lines cross the gate lines and the pull-around lines thereof. Accordingly, it is necessary to form lines as different layers to make the storage lines get over the gate lines and the pull-around lines. In this case however, the disconnection is liable to occur at the get-over portions and this constitutes a factor which impedes the enhancement of reliability.

Further, when the gate lines and the storage lines are made of aluminum or the like and are respectively subjected to anodization (anodic oxidation), since these lines get over each other, it is necessary to separately form these lines and this increases the process in number and becomes one factor which pushes up the manufacturing cost.

Accordingly, it is an object of the present invention to provide a display device of high display quality which can enhance the reliability such that even when gate lines are pulled out at both left and right picture frame regions, it is possible to provide a wiring pattern with no get-over portions between a gate wiring pattern which is constituted of gate lines and gate-line pull-around lines and a storage wiring pattern which is constituted of storage line and a common line which connect storage lines to each other.

SUMMARY OF INVENTION

To achieve the above-mentioned object, in the present invention, gate lines are pulled around at both left-side and right-side picture frame regions by means of gate-line pull-around lines and, at the same time, common lines which connect storage lines with each other are formed at both left-side and right-side picture frame regions so that a gate wiring pattern which is constituted of the gate lines and the gate-line pull-around lines and a storage wiring pattern which is constituted of the storage lines and the common lines form wiring patterns which do not cross each other. Further, in the present invention, the storage lines are vertically divided into upper and lower groups in the display region, and when the common lines which connect these storage lines are formed at both left and right picture frame regions, an auxiliary common line which alleviates the difference in voltage between the storage lines which are divided into the upper and lower groups is provided. To explain the representative constitutions of the present invention, they are as follows.

(1). In a display device comprising:

a substrate having a display region and picture frame regions which are arranged outside the display region and surround the display region;

a plurality of data lines which extend in the first direction and are arranged in parallel in the second direction which crosses the first direction on the display region of the substrate;

a plurality of gate lines which extend in the second direction and are arranged in parallel in the first direction on the display region of the substrate;

switching elements which are formed in the vicinity of crossing points between the data lines and the gate lines;

pixel electrodes each of which is formed in a region which is surrounded by the neighboring data lines and the neighboring gate lines; and a plurality of storage lines which extend in the second direction, are arranged in parallel in the first direction alternately with the gate lines, and form storage capacities between the pixel electrodes and the storage lines in the display region of the substrate, the improvement is characterized in that the substrate includes a plurality of connection terminals which are formed on a first side and are connected to an external circuit, first and second gate-line pull-around lines which are respectively formed on the picture frame regions at second and third sides close to the first side and pull out the plurality of gate lines in the direction toward the first side, and first and second common lines which are respectively formed on the picture frame regions at the second and third sides and connect the plurality of storage lines each other, a gate wiring pattern which is constituted of the plurality of gate lines and the first and second gate-line pull-around lines and a storage wiring pattern which is constituted of the plurality of storage lines and the first and second common lines are formed into wiring patterns which do not cross each other.

(2). In the constitution (1), the storage lines are divided into a group which is close to the first side and a group which is remote from the first side, the group which is close to the first side is connected to the first common line, and the group remote from the first side is connected to the second common line.

(3). In the constitution (1) or (2), at least a portion of the plurality of storage lines is connected to the first common line and the second common line.

(4). In the constitution (1), the storage wiring pattern is formed in a pattern in which the storage lines are formed in a zigzag shape between the first and second common lines.

(5). In the constitution (4), the first common lines are formed in a plural number and the second common lines are formed in a plural number, the display device includes an insulation layer which has contact holes at positions which overlap the first common lines, and a first bridging line which is formed at a position which overlaps the first common lines by way of the insulation layer and connects the plurality of first common lines together, and the display device further includes an insulation layer which has contact holes at positions which overlap the second common lines, and a second bridging line which is formed at a position which overlaps the second common lines by way of the insulation layer and connects the plurality of second common lines together.

(6). In any one of the constitutions (1) to (5), the plurality of connection terminals includes a feeding pad for applying a voltage to the storage wiring pattern.

(7). In any one of the constitutions (1) to (6), the plurality of gate lines and the plurality of storage lines are formed of the same material and on the same layer.

(8). In anyone of the constitutions (1) to (7), the display device includes a counter substrate which faces the substrate in an opposed manner and a liquid crystal layer which is sandwiched between the substrate and the counter substrate.

(9). In a display device comprising:

a substrate having a display region and picture frame regions which are arranged outside the display region and surround the display region;

a plurality of data lines which extend in the first direction and are arranged in parallel in the second direction which crosses the first direction on the display region of the substrate;

a plurality of gate lines which extend in the second direction and are arranged in parallel in the first direction on the display region of the substrate;

switching elements which are formed in the vicinity of crossing points between the data lines and the gate lines;

pixel electrodes each of which is formed in a region which is surrounded by the neighboring data lines and the neighboring gate lines; and a plurality of storage lines which extend in the second direction, are arranged in parallel in the first direction alternately with the gate lines, and form storage capacities between the pixel electrodes and the storage lines in the display region of the substrate;

the improvement is characterized in that the substrate includes a plurality of connection terminals which are formed on a first side and are connected to an external circuit, first and second gate-line pull-around lines which are respectively formed on the picture frame regions at second and third sides close to the first side and pull out the plurality of gate lines in the direction toward the first side, and first and second common lines which are respectively formed on the picture frame regions at the second and third sides and connect the plurality of storage lines each other, a gate wiring pattern which is constituted of the plurality of gate lines and the first and second gate-line pull-around lines and a storage wiring pattern which is constituted of the plurality of storage lines and the first and second common lines are formed into wiring patterns which do not cross each other, the plurality of connection terminals includes connection terminals which are relevant to the gate lines, connection terminals which are relevant to the data lines, and a feeding pad which applies a voltage to the storage wiring pattern, and the feeding pad is formed between the connection terminals which are relevant to the gate lines and the connection terminals which are relevant to the data lines.

(10). In the constitution (9), the storage wiring pattern is integrally formed and is connected to the feeding pad.

(11). In the constitution (10), the storage wiring pattern is also connected to a second feeding pad which is arranged at a position different from the position of the feeding pad.

(12). In the constitution (9), the storage wiring pattern is divided in two portions, and one portion is connected to the feeding pad and the other portion is connected to a second feeding pad which is arranged at a position different from the position of the feeding pad.

(13). In any one of the constitutions (9) to (12), the display device includes a counter substrate which faces the substrate in an opposed manner and a liquid crystal layer which is sandwiched between the substrate and the counter substrate.

(14). In a display device comprising:

a substrate having a display region and picture frame regions which are arranged outside the display region and surround the display region;

a plurality of data lines which extend in the first direction and are arranged in parallel in the second direction which crosses the first direction on the display region of the substrate;

a plurality of gate lines which extend in the second direction and are arranged in parallel in the first direction on the display region of the substrate;

switching elements which are formed in the vicinity of crossing points between the data lines and the gate lines;

pixel electrodes each of which is formed in a region which is surrounded by the neighboring data lines and the neighboring gate lines; and a plurality of storage lines which extend in the second direction, are arranged in parallel in the first direction alternately with the gate lines, and form storage capacities between the pixel electrodes and the storage lines in the display regions of the substrate, the improvement is characterized in that the substrate includes a plurality of connection terminals which are formed on a first side and are connected to an external circuit, first and second gate-line pull-around lines which are respectively formed on the picture frame regions at second and third sides close to the first side, and pull out the plurality of gate lines in the direction toward the first side, and first and second common lines which are respectively formed on the picture frame regions at the second and third sides, and connect the plurality of storage lines each other, a gate wiring pattern which is constituted of the plurality of gate lines and the first and second gate-line pull-around lines and a storage wiring pattern which is constituted of the plurality of storage lines and the first and second common lines are formed into wiring patterns which do not cross each other, a feeding line is formed on the picture frame region at the second side, the first gate-line pull-around line and the first common line are formed on the picture frame region at the second side, and the first gate-line pull-around line is positioned between the first common line and the feeding line, and the display device further includes an auxiliary common line which is insulated from the first gate-line pull-around line and electrically connects the first common line with the feeding line.

(15). In the constitution (14), the storage lines are divided into a group which is close to the first side and a group which is remote from the first side, the group which is close to the first side is connected to the first common line, and the group which is remote from the first side is connected to the second common line.

(16). In the constitution (14) or (15), the first common line and the second common line are connected with each other using at least a portion of the plurality of storage lines.

(17). In any one of the constitutions (14) to (16), the plurality of connection terminals include a feeding pad for applying a voltage to the storage wiring pattern.

(18). In any one of the constitutions (14) to (17), the plurality of gate lines and the plurality of storage lines are formed of the same material and on the same layer.

(19). In any one of the constitutions (14) to (18), the display device includes a counter substrate which faces the substrate in an opposed manner and a liquid crystal layer which is sandwiched between the substrate and the counter substrate.

(20). In a display device comprising:

a substrate having a display region and picture frame regions which are arranged outside the display region and surround the display region;

a plurality of data lines which extend in the first direction and are arranged in parallel in the second direction which crosses the first direction on the display region of the substrate;

a plurality of gate lines which extend in the second direction and are arranged in parallel in the first direction on the display region of the substrate;

switching elements which are formed in the vicinity of crossing points between the data lines and the gate lines;

pixel electrodes each of which is formed in a region which is surrounded by the neighboring data lines and the neighboring gate lines; and a plurality of storage lines which extend in the second direction, are arranged in parallel in the first direction alternately with the gate lines, and form storage capacities between the pixel electrodes and the storage lines in the display region of the substrate, the improvement is characterized in that the substrate includes a plurality of connection terminals which are formed on a first side and are connected to an external circuit, first and second gate-line pull-around lines which are respectively formed on the picture frame regions at second and third sides close to the first side and pull out the plurality of gate lines in the direction toward the first side, and first and second common lines which are respectively formed on the picture frame regions at the second and third sides and connect the plurality of storage lines each other, a gate wiring pattern which is constituted of the plurality of gate lines and the first and second gate-line pull-around lines and a storage wiring pattern which is constituted of the plurality of storage lines and the first and second common lines are formed into wiring patterns which do not cross each other, a feeding line is formed on the picture frame region at the second side, the first gate-line pull-around line and the first common line are formed on the picture frame region at the second side, and the first gate-line pull-around line is positioned between the first common line and the feeding line, and the display device further includes an auxiliary common line which is insulated from the first gate-line pull-around line and electrically connects the first common line with the feeding line, the plurality of connection terminals include connection terminals which are relevant to the gate lines, connection terminals which are relevant to the data lines, a first feeding pad which applies a voltage to the storage wiring pattern and a second feeding pad which applies a voltage to the feeding line, and the first feeding pad is formed between the connection terminals which are relevant to the gate lines and the connection terminals which are relevant to the data lines, and the connection terminals relevant to the gate lines are formed between the first feeding pad and the second feeding pad.

(21). In the constitution (20), the storage wiring pattern is integrally formed and is connected to the first feeding pad.

(22). In the constitution (21), the storage wiring pattern is also connected to a third feeding pad which is arranged at a position different from positions of the first and second feeding pads.

(23). In the constitution (20), the storage wiring pattern is formed such that the storage wiring pattern is divided into two portions, one portion is connected to the first and second feeding pads and the other portion is connected to a third feeding pad which is arranged at a position different from positions of the first and second feeding pads.

(24). In any one of the constitutions (20) to (23), the display device includes a counter substrate which faces the substrate in an opposed manner and a liquid crystal layer which is sandwiched between the substrate and the counter substrate.

The present invention is not limited to the above-mentioned constitutions and the constitutions of embodiments which will be explained later and it is needless to say that various modification are conceivable without departing from the technical concept of the present invention.

DESCRIPTION OF THE PREFERRED EMBODIMENTS

Preferred embodiments of the present invention are explained in detail hereinafter in conjunction with attached drawings which describe the embodiments. In the embodiments described hereinafter, the explanation is made using a liquid crystal display device as an example of the display device.

Figure 1:
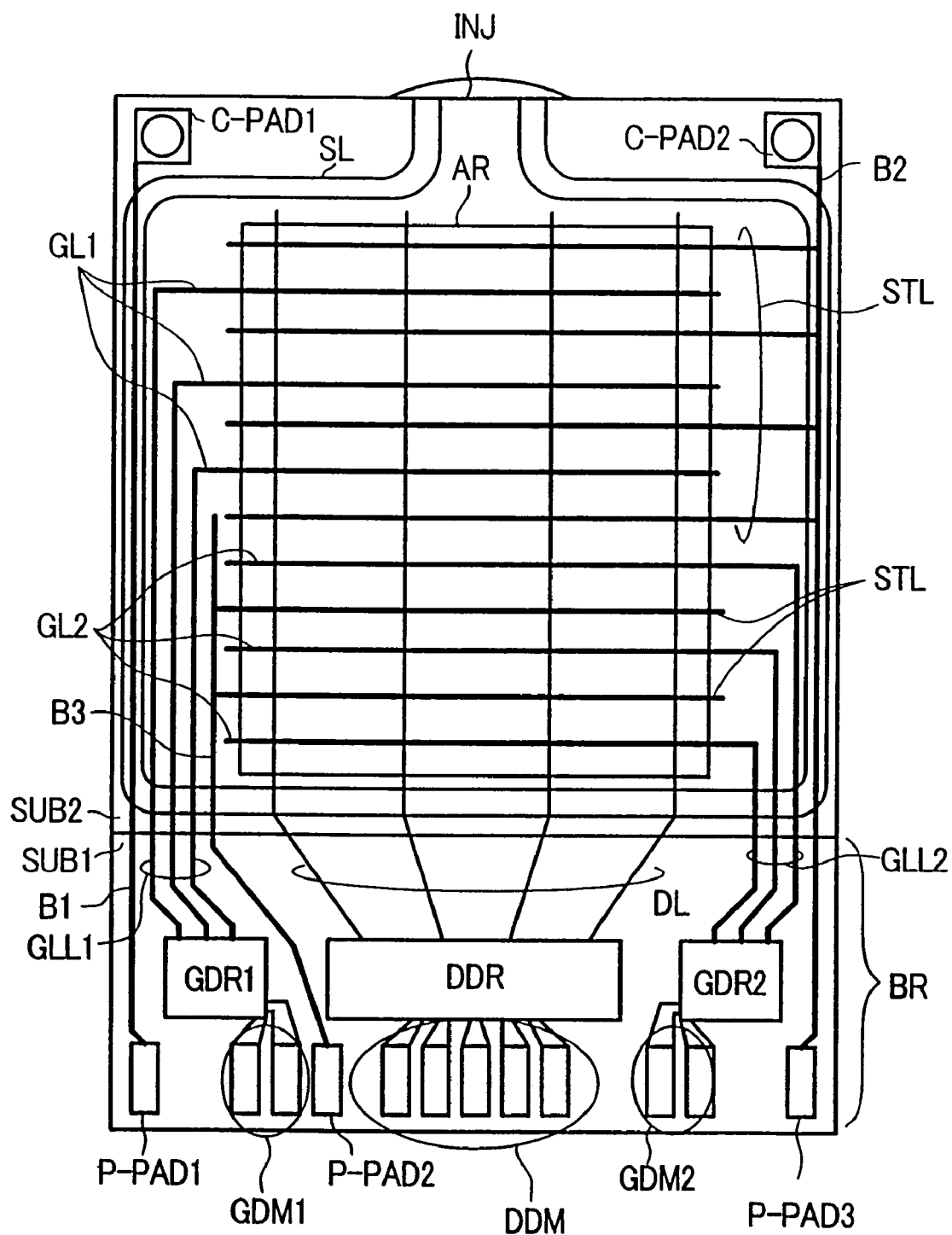
FIG. 1 is a plan view for schematically explaining a liquid crystal display device of the first embodiment of the present invention.

FIG. 1 is a plan view for schematically explaining a liquid crystal display device of the first embodiment of the present invention. In this liquid crystal display device, a first substrate SUB1 and a second substrate SUB2 are laminated to each other and liquid crystal (not shown in the drawing) is sealed between both substrates thus forming a display region AR, and a periphery of the display region AR is sealed by a sealing member SL. Reference symbol INJ indicates a liquid crystal filling port and is closed by a sealing member after the liquid crystal is sealed between both substrates. Regions other than the display region AR are referred to as picture frame regions. Here, one side (lower side in FIG. 1) of the first substrate SUB1 is stuck out from the second substrate SUB2.

On this portion which is disposed adjacent to the display region AR, a data line driving circuit (data driver; semiconductor integrated circuit or chip) DDR, gate line driving circuits (gate drivers; semiconductor integrated circuits or chips) GDR1, GDR2, input terminals DDM, GDM1, GDM2 of these driving circuits, and various feeding pads P-PAD1, P-PAD2, P-PAD3 are formed. This portion is referred to as a driving circuit mounting region BR. To the above-mentioned input terminals DDM, GDM1, GDM2 and various feeding pads P-PAD1, P-PAD2, P-PAD3 formed on the driving circuit mounting region BR, output terminals of a flexible printed circuit board not shown in the drawing are connected. Here, the data line driving circuit and the gate line driving circuits are so-called integrated circuits and include not only chips but also circuits which are directly built in the substrate. The same goes for other embodiments described hereinafter.

On the display region of the first substrate SUB1, a large number of data lines DL which extend in the longitudinal direction (first direction) of this substrate and are arranged in parallel in the lateral direction (second direction) are formed. These data lines DL are connected to output terminals of the data driver DDR mounted on the driving circuit mounting region BR. Further, in the same manner, on the display region of the first substrate SUB1, a large number of gate lines GL which extend in the lateral direction (second direction) and are arranged in parallel in the longitudinal direction (first direction) are formed. These gate lines GL are divided into two groups GL1, GL2 in the vertical direction with respect to the display region AR, wherein respective groups are connected to output terminals of the gate drivers GDR1, GDR2 which are mounted on the driving circuit mounting region BR for driving the above-mentioned two groups of gate lines by way of gate-line pull-around lines GLL1, GLL2 which pass left-side and right-side picture frame regions.

In this manner, by wiring the gate lines GL in the state that the gate lines GL are divided into two groups GL1, GL2, it is possible to obtain the so-called screen center arrangement which arranges the display region AR substantially at the center with respect to the left and right directions (horizontal direction) of the first substrate SUB1).

Although a large number of thin film transistors are provided as switching elements to respective pixels which are formed on respective crossing portions between the data lines DL and the gate line GL in the display region AR, they are omitted from the drawing. Further, although each pixel on which the thin film transistor is formed includes a pixel electrode, this pixel electrode is also not shown in the drawing.

On an inner surface of the second substrate SUB2, counter electrodes which face the above-mentioned pixel electrodes in an opposed manner are formed. Further, in case of color display, color filters of a plurality of colors are provided above or below the counter electrodes. However, the color filters are omitted from the drawing along with the counter electrodes. The counter electrodes are connected to the feeding pads P-PAD1, P-PAD3 formed on the driving circuit mounting region BR through counter electrode connection pads C-PAD1, C-PAD2 formed on corner portions of an upper side of the first substrate SUB1 and common lines B1, B2.

Storage lines STL are formed between the gate lines GL (GL1, GL2) of the first substrate SUB1. These storage lines STL are vertically divided into two groups with respect to the display region of the first substrate SUB1, wherein the lower-side group is connected to the feeding pad P-PAD2 formed on the driving circuit mounting region BR through a common line B3 formed at the left side and the upper-side group is connected to the feeding pad P-PAD3 formed on the driving circuit mounting region BR formed at the right side through a common line B2.

Electricity is supplied to the storage lines STL through the feeding pads P-PAD2 and P-PAD3. Further, since the counter electrode connection pads C-PAD1 and C-PAD2 are connected by the counter electrodes, it is also true that electricity is supplied to the storage line STL through the counter electrode connection pads C-PAD1 and C-PAD2 and the feeding pad P-PAD1. Accordingly, even when either one of common lines B1, B2 is disconnected or suffers from the increase of resistance, the sufficient supply of electricity to the storage lines STL is ensured.

By constituting the liquid crystal display device as described in this embodiment, there exists no portion on the plane of the substrate where the storage wiring pattern (storage lines and common lines) and the gate wiring pattern (gate lines and gate-line pull-around line) cross each other. Accordingly, the storage lines STL and the gate lines GL can be formed on the same layer. Further, even when the storage lines STL and the gate lines GL are formed on separate layers, there exists no portion where they get over each other so that it is unnecessary to consider the occurrence of disconnection failure. Further, since the storage lines STL and the gate lines GL are formed on the same layer, when these lines are formed by patterning using aluminum material, the anodization for avoiding the occurrence of hillock can be performed with one process so that there is no increase of manufacturing steps. Further, respective lines including the pull-around lines are arranged in a left-and-right symmetry with respect to the display region AR and hence, the display region AR can be also arranged at the center of the liquid crystal display device.

Further, the feeding pad P-PAD2 which applies a voltage to the storage wiring pattern is formed between connection terminals (GDM1) which are relevant to the gate lines and connection terminals (DDM) which are relevant to the data lines and hence, feeding of electricity is possible from the feeding pad P-PAD2. Accordingly, even when the storage wiring pattern is separately formed in halves as in the case of this embodiment, feeding of electricity can be performed. Further, the gate drivers GDR1, GDR2 and the data driver DDR may be formed as one circuit by forming them into one chip. These explanations are applicable to embodiments described hereinafter in the same manner.

In this manner, according to this embodiment, it is possible to provide the highly reliable storage-line type liquid crystal display device which can obviate the increase of the manufacturing process.

Figure 2:
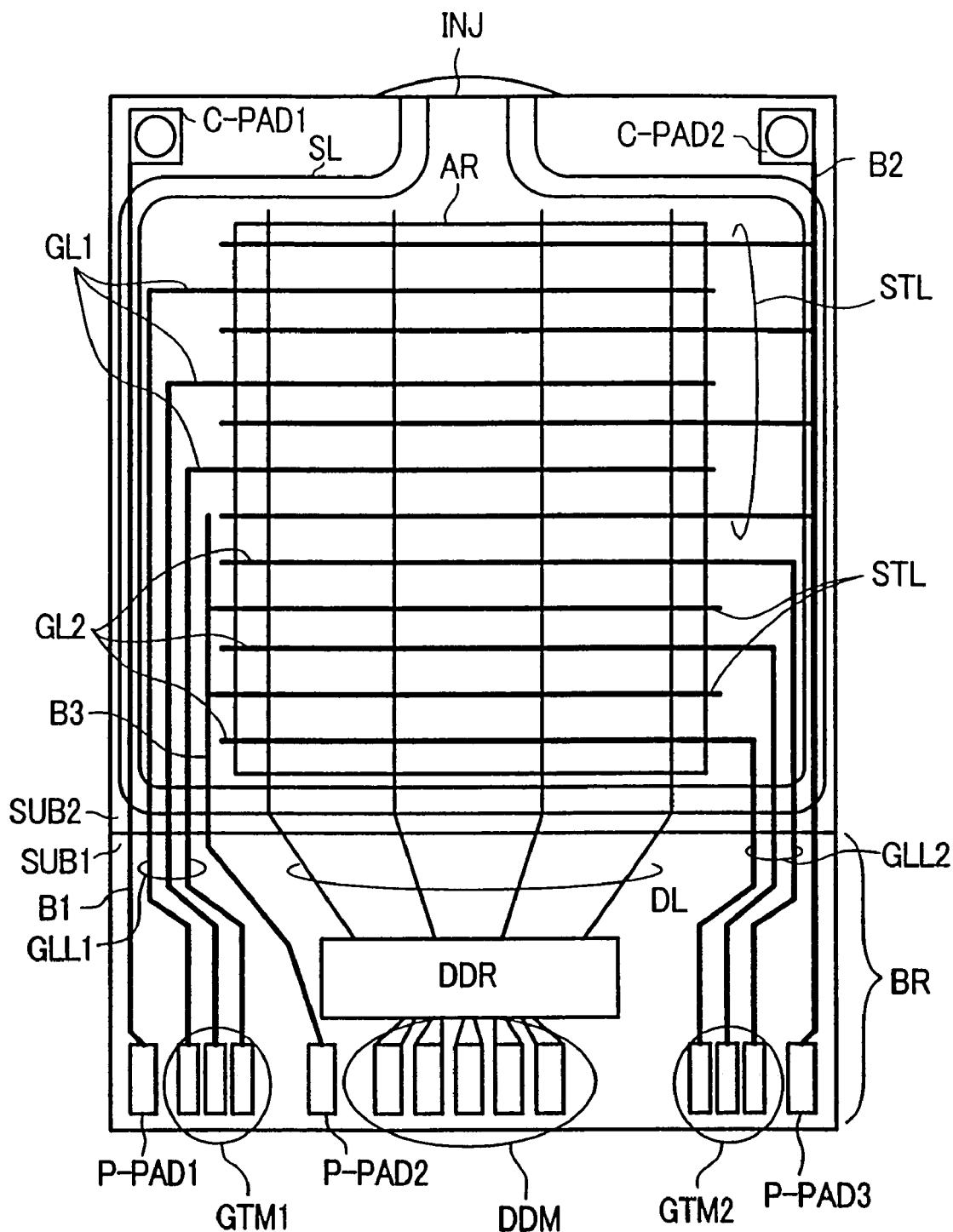
FIG. 2 is a plan view for schematically explaining a liquid crystal display device of the second embodiment of the present invention.

FIG. 2 is a plan view for schematically explaining a liquid crystal display device of the second embodiment of the present invention. Symbols which are equal to those of FIG. 1 indicate parts having identical functions. This embodiment relates to a constitutional example in which only the data driver DDR is mounted on the driving circuit mounting region BR in the above-mentioned first embodiment and the gate drivers are mounted on a flexible printed circuit board side not shown in the drawing. The arrangement of the data lines DL, the gate lines GL and the storage lines STL formed on the display region AR is similar to the corresponding arrangement of the first embodiment and hence, the repeated explanation of the arrangement is not made.

In this embodiment, gate-line pull-around lines GLL1, GLL2 are directly connected to the gate terminals GTM1, GTM2 formed on the driving circuit mounting region BR. The gate terminals GTM1, GTM2 are connected to output terminals of gate drivers (similar to gate drivers GDR1, GDR2 in FIG. 1) mounted on a flexible printed circuit board not shown in the drawing so as to supply gate-line driving voltages to the gate lines GL1, GL2. Accordingly, areas of various lines and pads which are formed on the driving circuit mounting region BR can be increased.

By constituting the liquid crystal display device as in the case of this embodiment, portions on the plane of the substrate where the storage wiring pattern and the gate wiring pattern cross each other can be eliminated in the same manner as the first embodiment and hence, the storage lines STL and the gate lines GL can be formed on the same layer. Further, even when the storage lines STL and the gate lines GL are formed on separate layers, there exists no portion where they get over each other so that it is unnecessary to consider the occurrence of disconnection failure. Further, since the storage lines STL and the gate lines GL are formed on the same layer, when these lines are formed by patterning using aluminum material, the anodization for avoiding the occurrence of hillock can be performed with one process so that there is no increase of manufacturing steps. Further, respective lines including the pull-around lines are arranged in a left-and-right symmetry with respect to the display region AR and hence, the display region AR can be also arranged at the center of the liquid crystal display device.

Further, the feeding pad P-PAD2 which applies a voltage to the storage wiring pattern is formed between connection terminals which relate to the gate lines (here, GTM1 different form FIG. 1) and connection terminals (DDM) which relate to the data lines so that the feeding of electricity is possible from this feeding pad P-PAD2. Here, the data drivers are also provided outside the substrate SUB1, data terminals which supply a data line driving voltage to the data lines DL are formed on the substrate SUB1 as the connection terminals which relate to the data lines, and these data terminals may be connected to the output of the data driver. These explanations are also applicable to the embodiments described hereinafter in the same manner.

In this manner, according to this embodiment, in the same manner as the first embodiment, it is possible to provide the highly reliable storage line type liquid crystal display device without increasing the manufacturing process.

Figure 3:
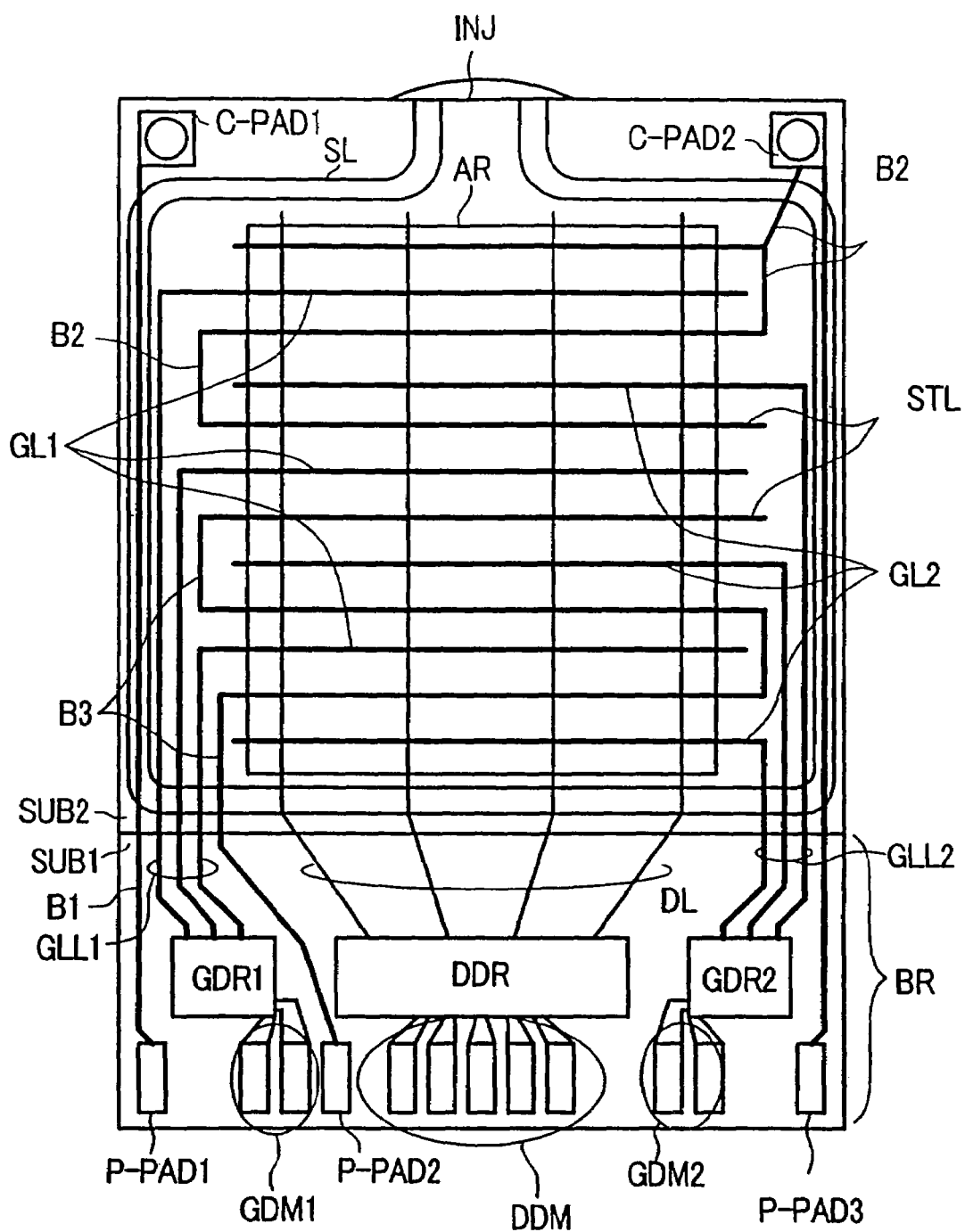
FIG. 3 is a plan view for schematically explaining a liquid crystal display device of the third embodiment of the present invention.

FIG. 3 is a plan view for schematically explaining a liquid crystal display device of the third embodiment of the present invention. Symbols which are equal to those of FIG. 1 and FIG. 2 indicate parts having identical functions. The liquid crystal display device is characterized in that in place of the arrangement of gate lines shown in FIG. 1 or FIG. 2, the gate lines GL1, GL2 of respective groups which are driven by the gate drivers GDR1, GDR2 extend alternately from both left and right sides with respect to the display region AR. Due to such an arrangement of the gate lines GL1, GL2, the storage lines STL which are divided into two groups, that is, upper and lower groups can be connected by the common lines B2 or B3 every two other lines one gate line between them.

That is, electricity is supplied to the upper group of storage lines STL from the feeding pad P-PAD3 through the counter electrode connection pad C-PAD2 and the common line B2, while electricity is supplied to the lower group of storage lines STL from the feeding pad P-PAD2 through the common line B3. Here, it is possible to connect the common line B2 to the feeding pad P-PAD3 without going through the counter electrode connection pad C-PAD2.

According to this embodiment, at least a portion of a plurality of storage lines STL can form a pattern with no wiring get-over by connecting the common line in the left-side picture frame region and the common line in the right-side picture frame region. Here, in this embodiment, the storage wiring pattern is arranged in a zigzag shape between common lines of both left and right sides. In this embodiment the storage lines STL are made to move in a zigzag pattern as a pair consisting of two storage lines. However, three or more storage lines may be combined into a set and is formed in a zigzag pattern. These explanations are applicable to embodiments which will be explained later.

By constituting the liquid crystal display device as described in this embodiment, portions on the plane of the substrate where the storage wiring pattern and the gate wiring pattern cross each other can be eliminated in the same manner as the first embodiment and the second embodiment and hence, the storage lines STL and the gate lines GL can be formed on the same layer. Further, even when the storage lines STL and the gate lines GL are formed on separate layers, there exists no portion where they get over each other so that it is unnecessary to consider the occurrence of disconnection failure. Further, since the storage lines STL and the gate lines GL are formed on the same layer, the anodization for avoiding the occurrence of hillock which may take place when these lines are formed by patterning using aluminum material can be performed with one process. Accordingly, there is no increase of manufacturing steps. Further, respective lines including the pull-around lines are arranged in a left-and-right symmetry with respect to the display region AR and hence, the display region AR can be also arranged at the center of the liquid crystal display device.

Due to this embodiment, in the same manner as the first embodiment and the second embodiment, it is possible to provide the highly reliable storage-line type liquid crystal display device which can obviate the increase of the manufacturing process.

Figure 4:
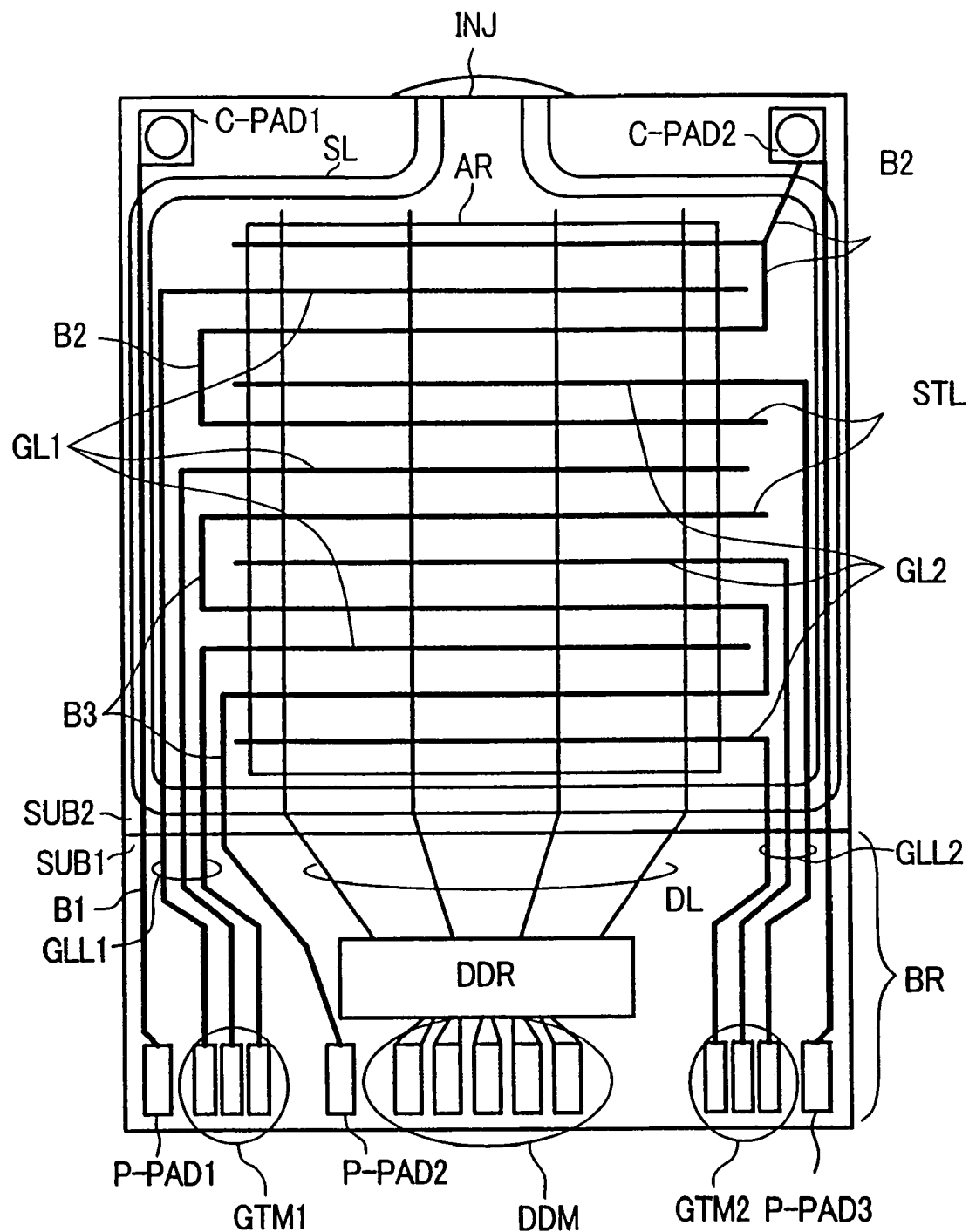
FIG. 4 is a plan view for schematically explaining a liquid crystal display device of the fourth embodiment of the present invention.

FIG. 4 is a plan view for schematically explaining a liquid crystal display device of the fourth embodiment of the present invention. Symbols which are equal to those of FIG. 3 indicate parts having identical functions. This embodiment relates to a constitutional example in which only the data driver DDR is mounted on the driving circuit mounting region BR in the above-mentioned third embodiment and the gate drivers are mounted on a flexible printed circuit board side not shown in the drawing. The arrangement of the data lines DL, the gate lines GL and the storage lines STL formed on the display region AR is similar to the corresponding arrangement of the third embodiment and hence, the repeated explanation of the arrangement is not made.

In this embodiment, gate-line pull-around lines GLL1, GLL2 are directly connected to the gate terminals GTM1, GTM2 formed on the driving circuit mounting region BR. The gate terminals GTM1, GTM2 are connected to output terminals of gate drivers (similar to gate drivers GDR1, GDR2 in FIG. 1) mounted on a flexible printed circuit board not shown in the drawing so as to supply gate-line driving voltages to the gate lines GL1, GL2. Accordingly, areas of various lines and pads which are formed on the driving circuit mounting region BR can be increased.

By constituting the liquid crystal display device as described in this embodiment, portions on the plane of the substrate where the storage wiring pattern and the gate wiring pattern cross each other can be eliminated in the same manner as the third embodiment and hence, the storage lines STL and the gate lines GL can be formed on the same layer. Further, even when the storage lines STL and the gate lines GL are formed on separate layers, there exists no portion where they get over each other so that it is unnecessary to consider the occurrence of disconnection failure. Further, since the storage lines STL and the gate lines GL are formed on the same layer, the anodization for avoiding the occurrence of hillock which may take place when these lines are formed by patterning using aluminum material can be performed with one process. Accordingly, there is no increase of manufacturing steps. Further, respective lines including the pull-around lines are arranged in a left-and-right symmetry with respect to the display region AR and hence, the display region AR can be also arranged at the center of the liquid crystal display device.

Due to this embodiment, in the same manner as the first to the third embodiments, it is possible to provide the highly reliable storage-line type liquid crystal display device which can obviate the increase of the manufacturing process.

Figure 5:
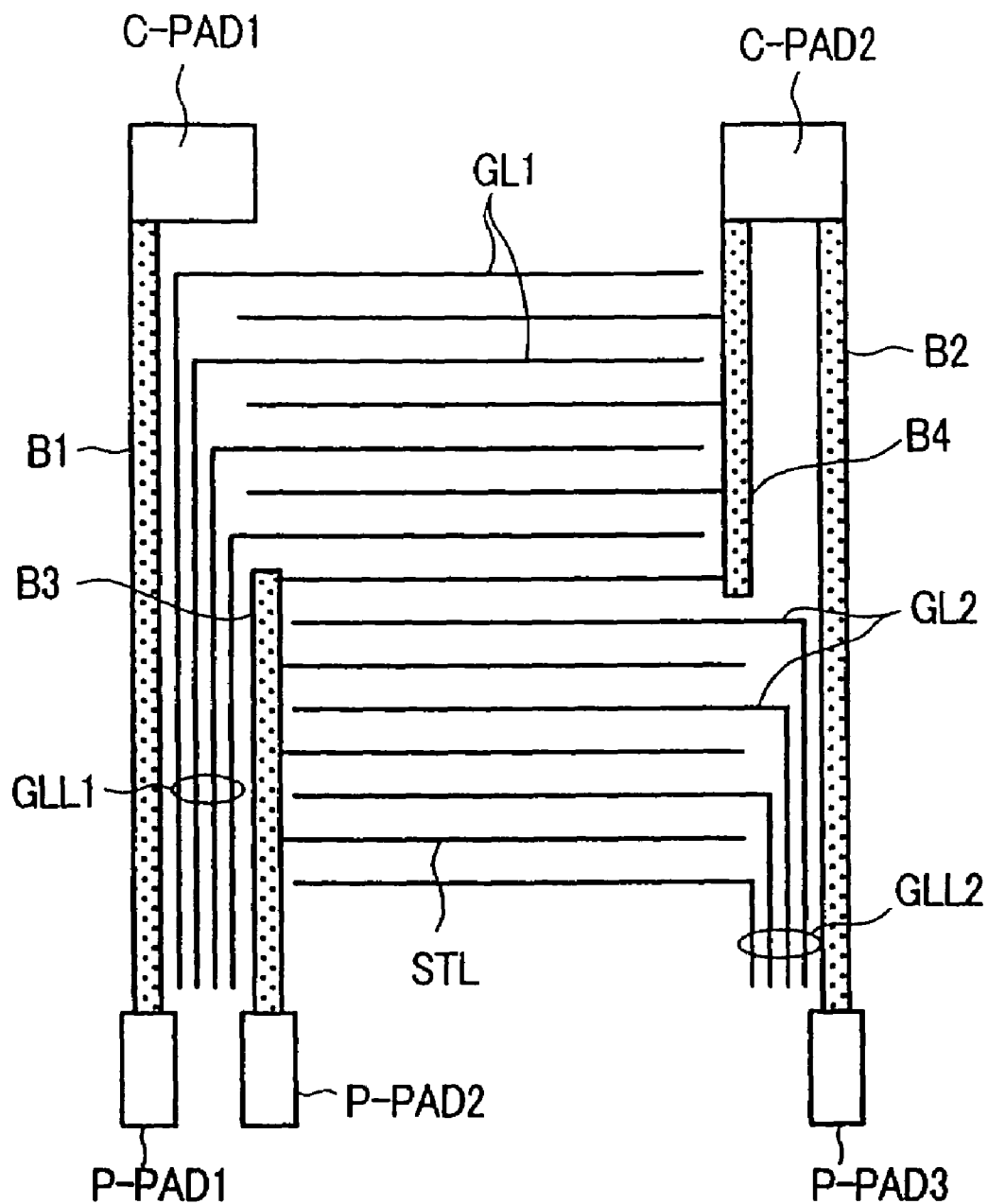
FIG. 5 is a schematic view for explaining the wiring arrangement in a liquid crystal display device of the fifth embodiment of the present invention.

FIG. 5 is a schematic view for explaining the wiring arrangement of a liquid crystal display device according to the fifth embodiment of the present invention. Symbols which are equal to those of FIG. 1 and FIG. 2 indicate parts having identical functions. In the above-mentioned liquid crystal display devices of the first embodiment and the second embodiment, it is assumed that the storage lines STL which are divided into a plurality of groups in the vertical direction of the display region AR are physically independent from each other within the display region AR. In this embodiment, a common line B4 for a group of storage lines STL which is formed by dividing corresponding to the first group of gate lines GL1 and a common line B3 for a group of storage lines STL which is formed by dividing corresponding to the second group of gate lines GL2 are connected to both ends of the storage line STL within the display region AR thus physically connecting these groups of storage lines STL. Here, the common line B4 may be substituted by the common line B2. However, the crossing of wiring is prohibited. The same goes for embodiments described hereinafter.

By connecting the storage lines STL of divided groups in this manner, in addition to the above-mentioned advantageous effects of respective embodiments, the feeding of electricity can be ensured even when the connection failure occurs with respect to one feeding path. Further, since electricity can be supplied at both ends of the storage line STL, the waveform of voltage supplied to the storage line STL is prevented from becoming dull. Accordingly, it is possible to provide the highly reliable storage line type liquid crystal display device.

As described in this embodiment, by connecting the common line of the left-side picture frame region and the common line of the right-side picture frame region using at least a portion of a plurality of storage lines STL, it is possible to form the pattern having no wiring get-over. Further, when the storage wiring patterns are integrally formed as in the case of this embodiment, it is not always necessary to feed electricity from both ends and electricity may be supplied only from the feeding pad P-PAD2, for example. The same goes for embodiments described hereinafter.

Figure 6:
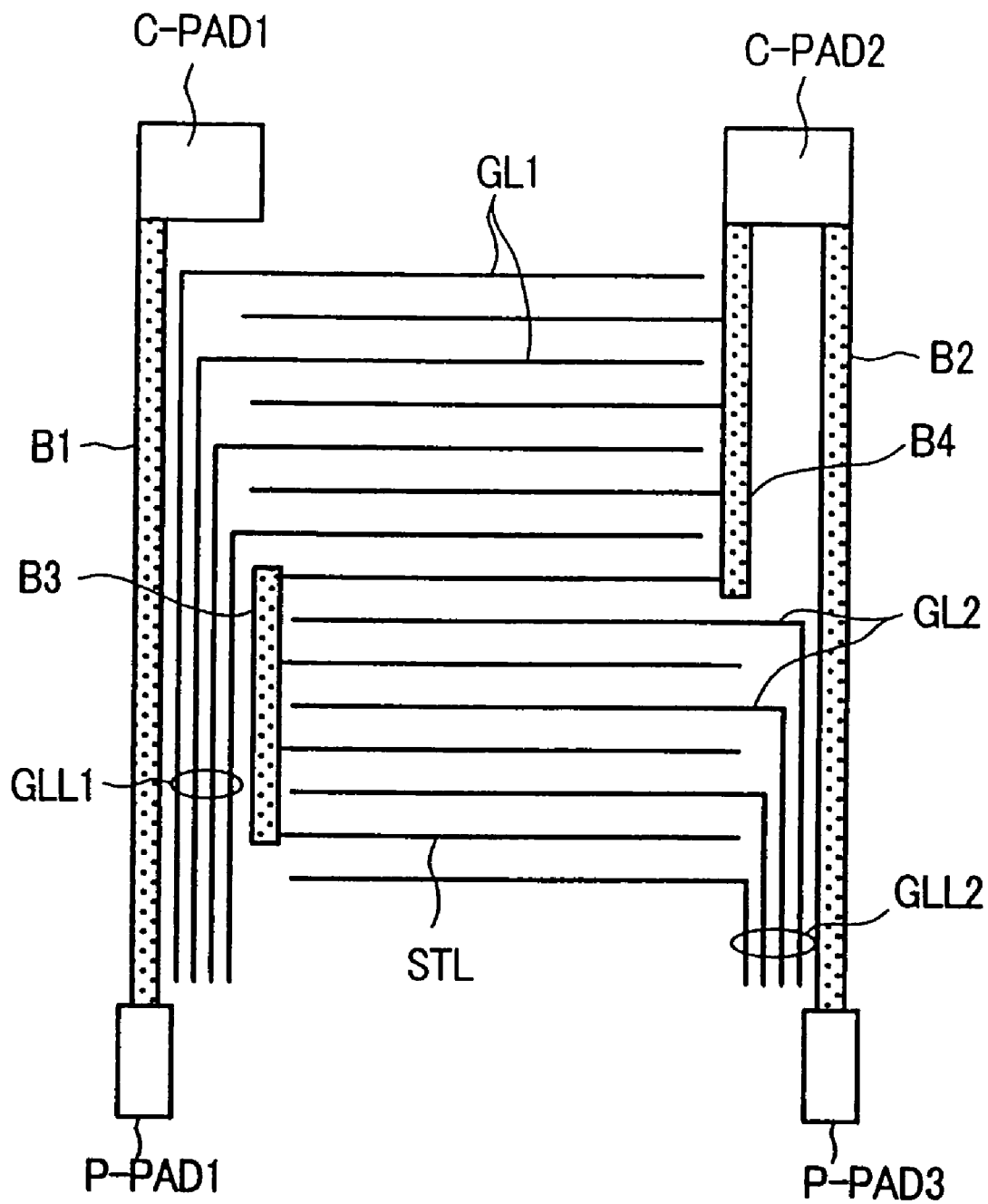
FIG. 6 is a schematic view for explaining the wiring arrangement in a liquid crystal display device of the sixth embodiment of the present invention.

FIG. 6 is a schematic view for explaining the wiring arrangement of a liquid crystal display device according to the sixth embodiment of the present invention. Symbols which are equal to those of FIG. 5 indicate parts having identical functions. As described above, in the liquid crystal display devices of the first embodiment and the second embodiment, it is assumed that the storage lines STL which are divided into a plurality of groups in the vertical direction of the display region AR are physically independent from each other within the display region AR. According to this embodiment, in the same manner as the fifth embodiment, a common line B4 for a group of storage lines STL which is formed by dividing corresponding to the first group of gate lines GL1 and a common line B3 for a group of storage lines STL which is formed by dividing corresponding to the second group of gate lines GL2 are connected to both ends of the storage line STL within the display region AR thus physically connecting these groups of storage lines STL. Further, the common line B3 for a group of storage lines STL which is formed by dividing corresponding to the second group of gate lines GL2 is not provided with the feeding pad. Accordingly, electricity is supplied to these storage lines STL also from the feeding pad P-PAD3.

According to this embodiment, the number of pads formed on the driving circuit mounting region BR can be reduced and it is possible to provide the highly reliable storage line type liquid crystal display device by making use of the space of the driving circuit mounting region BR.

Figure 7:
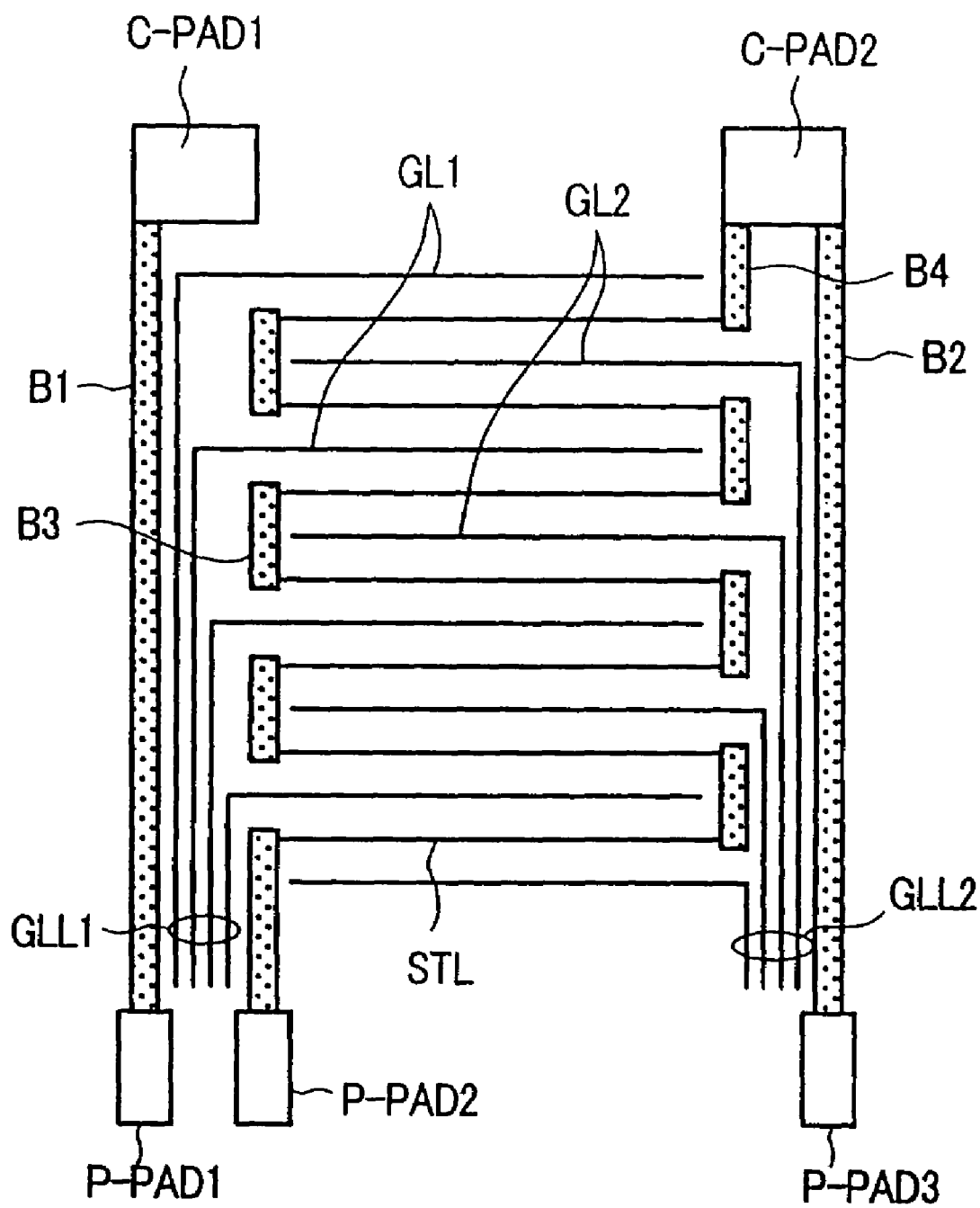
FIG. 7 is a schematic view for explaining the wiring arrangement in a liquid crystal display device of the seventh embodiment of the present invention.

FIG. 7 is a schematic view for explaining the wiring arrangement of a liquid crystal display device according to the seventh embodiment of the present invention. Symbols which are equal to those of FIG. 5 and FIG. 6 indicate parts having identical functions. In the liquid crystal display devices of the above-mentioned third embodiment or fourth embodiment, the storage lines STL are vertically divided into a plurality of groups in the display region AR, and a plurality of groups of storage lines STL are physically independent from each other within the display region AR. However, in this embodiment, these groups of storage lines STL are physically connected to each other.

By connecting the storage lines STL of divided groups in this manner, in the same manner as the above-mentioned fifth embodiment, the feeding of electricity can be ensured even when the connection failure occurs with respect to one feeding path. Further, since electricity can be supplied at both ends of the storage line STL, the waveform of voltage supplied to the storage line STL is prevented from becoming dull. Accordingly, it is possible to provide the highly reliable storage line type liquid crystal display device.

Figure 8:
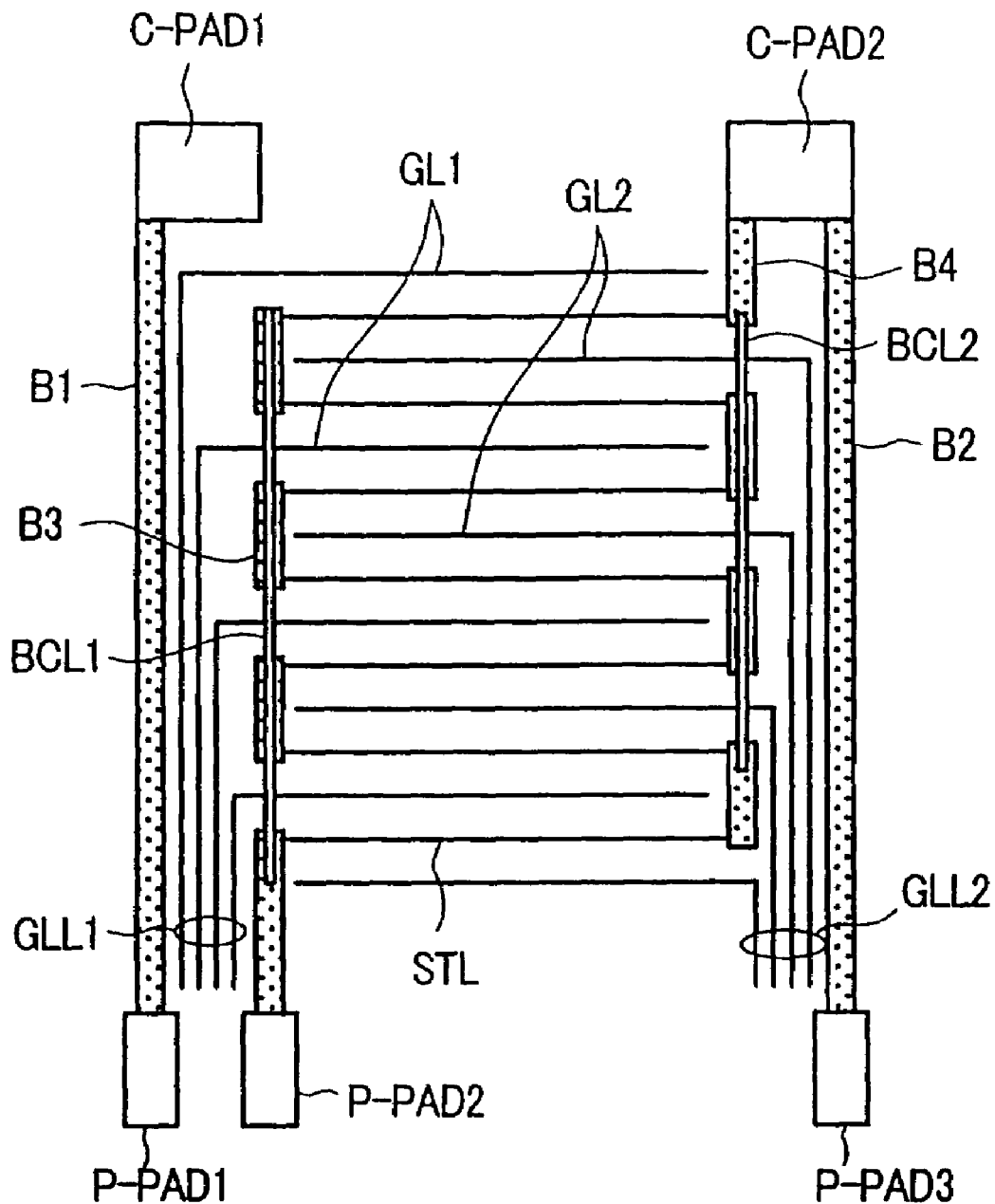
FIG. 8 is a schematic view for explaining the wiring arrangement in a liquid crystal display device of the eighth embodiment of the present invention.

FIG. 8 is a schematic view for explaining the wiring arrangement of a liquid crystal display device according to the eighth embodiment of the present invention. Symbols which are equal to those of FIG. 7 indicate parts having identical functions. This embodiment is characterized by having bridging lines BCL1, BCL2 which respectively connect common lines B3, B4 of storage lines STL in FIG. 7. These bridging lines BCL1, BCL2 are formed over the gate lines GL and the storage lines STL by way of an insulation layer. Contact holes are formed in the insulation layer at positions of the common lines B3, B4. Accordingly, although the process for forming the bridging lines BCL1, BCL2 is added, electricity can be surely supplied to the storage lines STL whereby the liquid crystal display device having increased reliability can be provided. When the storage lines STL are formed on the same layer as the data lines DL, the increase of process can be obviated.

Figure 9:
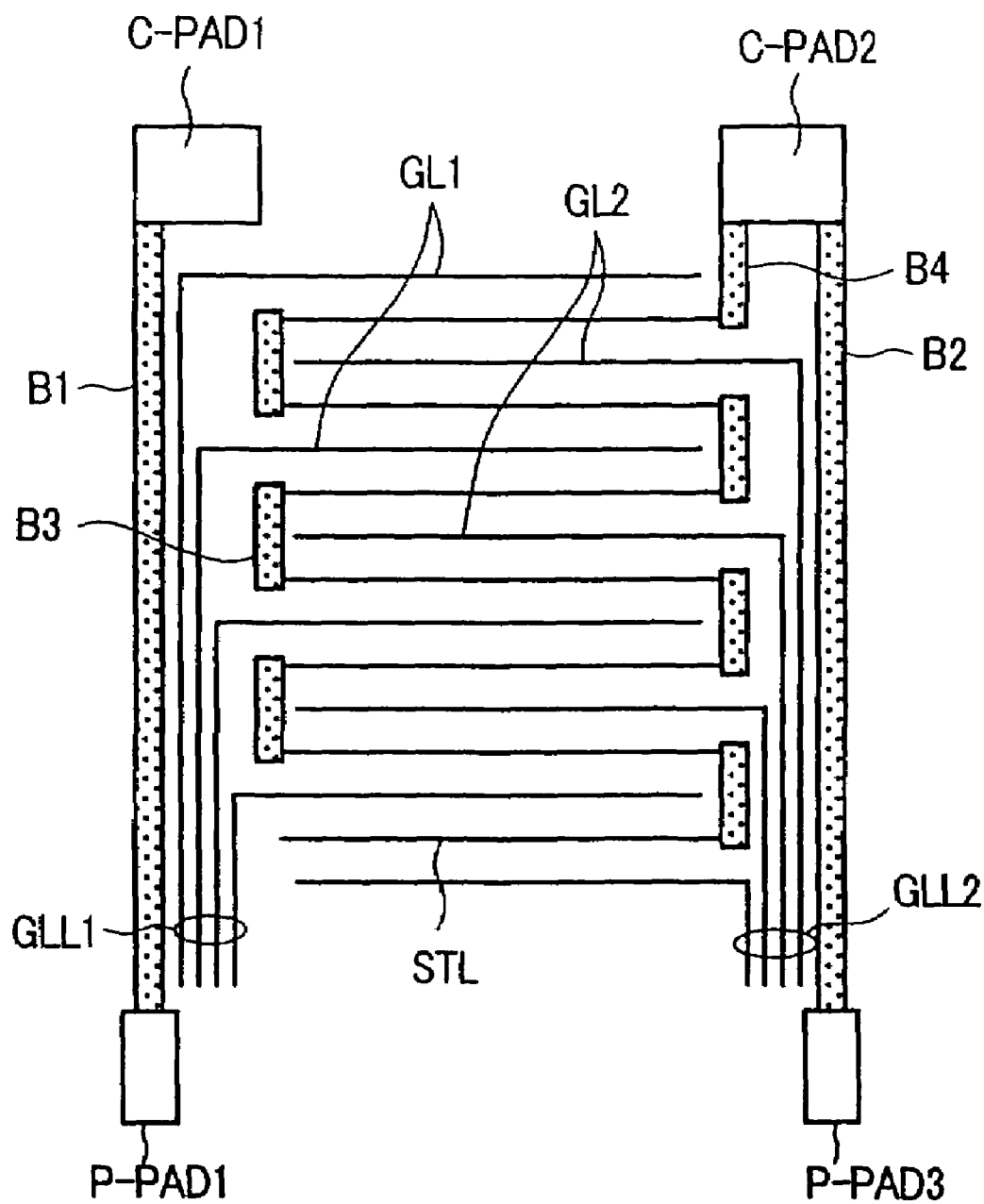
FIG. 9 is a schematic view for explaining the wiring arrangement in a liquid crystal display device of the ninth embodiment of the present invention.

FIG. 9 is a schematic view for explaining the wiring arrangement of a liquid crystal display device according to the ninth embodiment of the present invention. This embodiment is configured such that the feeding pad P-PAD2 in the above-mentioned seventh embodiment is removed and electricity is supplied to the storage lines STL through the feeding pad P-PAD3 in the same manner as the embodiment 6.

According to this embodiment, the number of pads formed on the driving circuit mounting region BR can be reduced so that the space of the driving circuit mounting region BR is effectively used thus providing the highly reliable storage line type liquid crystal display device.

Figure 10:
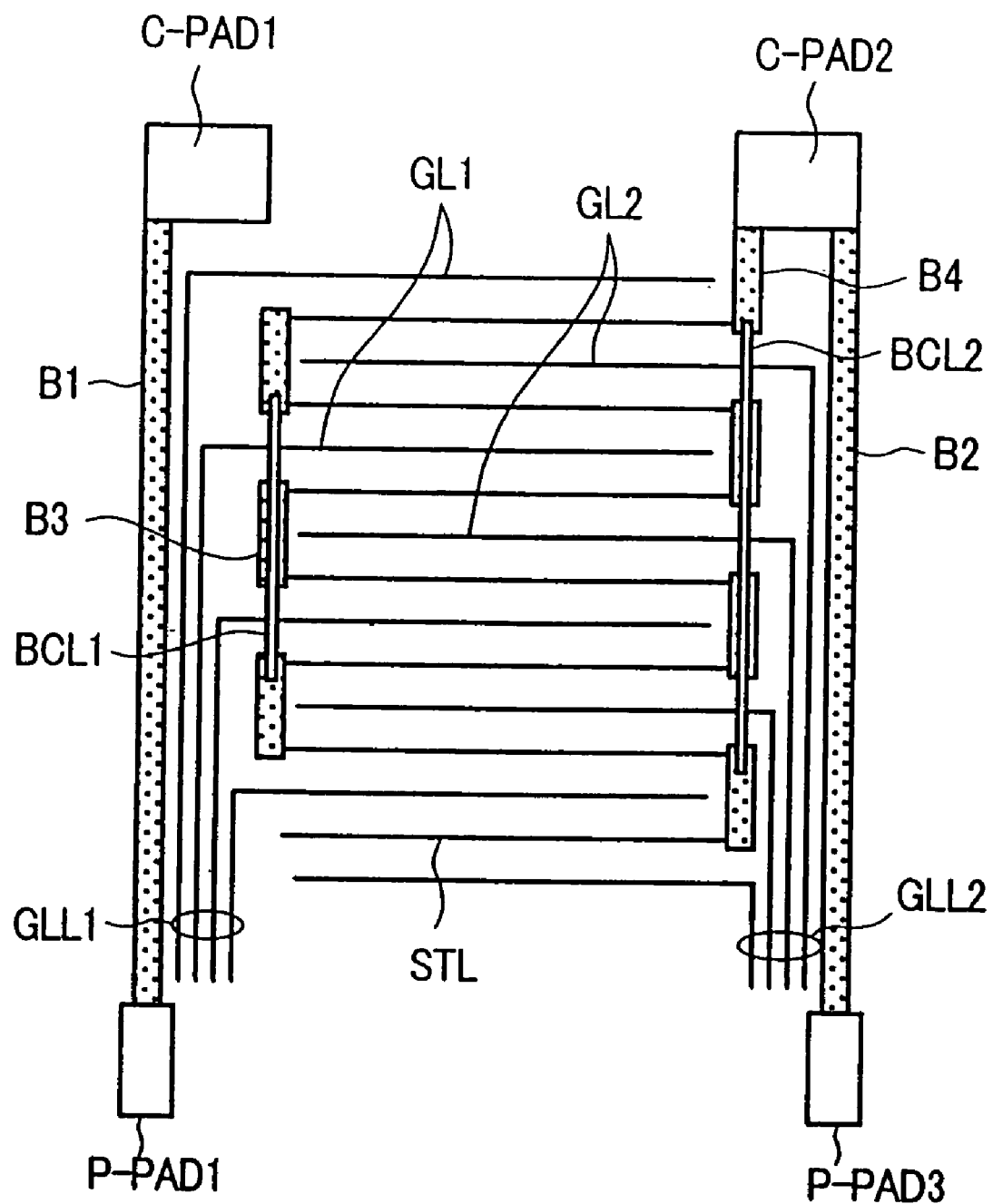
FIG. 10 is a schematic view for explaining the wiring arrangement in a liquid crystal display device of the tenth embodiment of the present invention.

FIG. 10 is a schematic view for explaining the wiring arrangement of a liquid crystal display device according to the tenth embodiment of the present invention. This embodiment is characterized by providing the bridging lines BCL1, BCL2 which have been explained with respect to the eighth embodiment to the above-mentioned ninth embodiment. These bridging lines BCL1, BCL2 are also formed over the gate lines GL and the storage lines STL by way of an insulation layer in the same manner as the wiring arrangement shown in FIG. 8. Contact holes are formed in the insulation layer at positions of the common lines B3, B4. Accordingly, although the process for forming the bridging lines BCL1, BCL2 is increased in number, electricity can be surely supplied to the storage lines STL whereby the liquid crystal display device having increased reliability can be provided. When the storage lines STL are formed on the same layer as the data lines DL, the increase of process can be obviated. With respect to other constitutions and advantageous effects, they are equal to those of the ninth embodiment.

Figure 11:
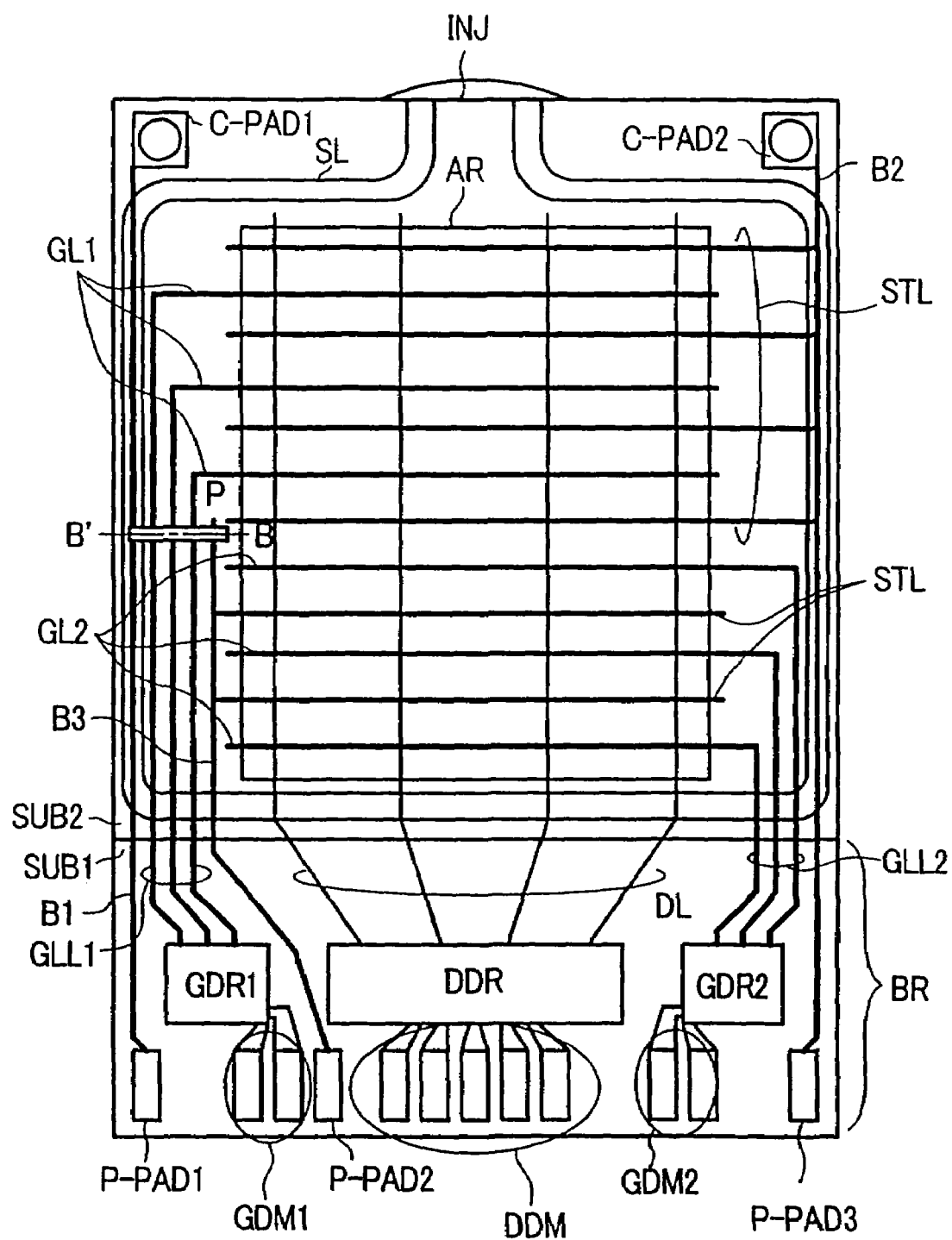
FIG. 11 is a plan view for schematically explaining a liquid crystal display device of the eleventh embodiment of the present invention.

FIG. 11 is a plan view for schematically explaining the wiring arrangement of a liquid crystal display device according to the eleventh embodiment of the present invention, wherein this embodiment constitutes a modification of the embodiment shown in FIG. 1. That is, this embodiment is constituted such that the data line driving circuit DDR and two gate line driving circuits GDR1, GDR2 are mounted on the driving circuit mounting region BR. Symbols which are equal to those of the above-mentioned embodiments indicate parts having identical functions. In the liquid crystal display device having the constitution shown in the previous FIG. 1 and FIG. 2 or FIG. 5 and FIG. 6, that is, the constitution in which the storage lines are vertically divided into two groups in the effective region, the feeding resistance of wiring may differ between these groups of storage lines. For example, there may be a case that a portion of the line which connects the feeding pad P-PAD2 and the common line B3 is narrow. Due to the difference of voltage derived from this difference in resistance, there arises difference in brightness between pixels arranged at upper and lower portion of the screen which are connected to the upper and lower storage lines thus degrading image qualities.

The basic wiring structure shown in FIG. 11 is substantially equal to the basic wiring structure shown in FIG. 1. In this liquid crystal display device, at the left-side picture frame region of the display region AR as viewed facing FIG. 11, a large number of gate-line pull-around lines GLL1 are provided. At both sides of the gate-line pull-around lines GLL1, the common line B1 which connects the counter electrode connection pad C-PAD1 to the feeding pad P-PAD1 and the common line B3 which connects lower-side storage lines STL in common are arranged. Accordingly, it is difficult for the wiring area of the common line B3 to ensure the sufficient wiring width compared to the common line B2 which is formed on the right-side picture frame region of the display region AR as viewed facing FIG. 11. As a result, there arises the above-mentioned difference in brightness between the pixels in the upper and lower portions of the screen.

In this embodiment, the common line B1 which connects the counter electrode connection pad C-PAD1 to the feeding pad P-PAD1 and the common line B3 which connects the lower-side storage lines STL in common are electrically connected by the auxiliary common line CBL. In this case, the common line B1 may be referred to as the feeding line. The counter electrode connection pad C-PAD1 is connected to the feeding pad P-PAD3 arranged at the right-side of the display region AR by way of the counter electrodes formed on the second substrate SUB2. Due to such a constitution, the potential of the lower-side storage lines STL which are connected to the common line B1 becomes substantially equal to the potential of the upper-side storage lines STL. Here, it is defined that the auxiliary common line CBL does not constitute the constitutional element of the storage wiring pattern. Accordingly, the gate wiring pattern and the storage wiring pattern do not cross each other.

Figure 12:
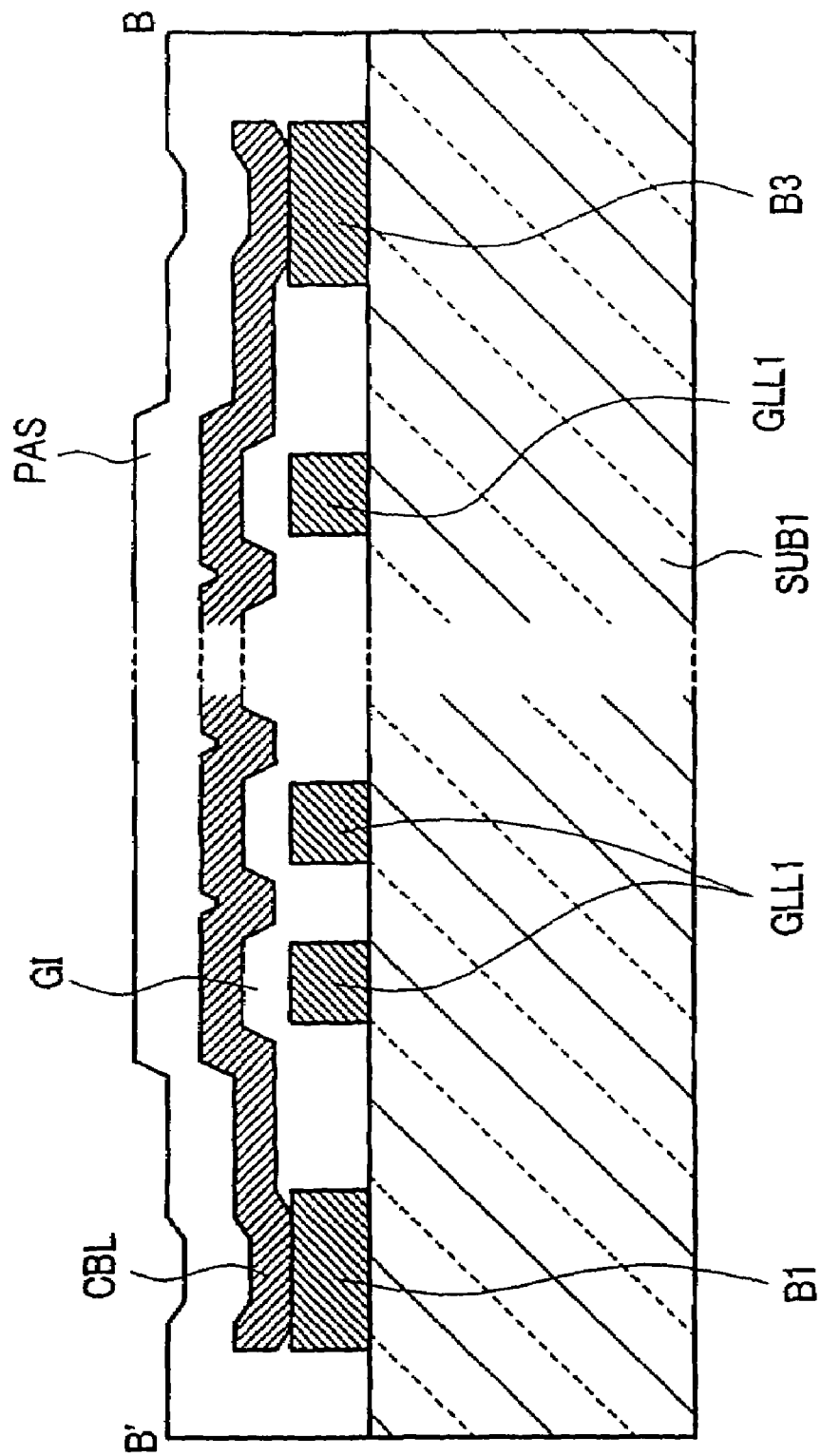
FIG. 12 is a cross-sectional view of an auxiliary common line portion taken along a line B–B' in FIG. 11.

FIG. 12 is a cross-sectional view of a portion of the auxiliary common line taken along a line B–B' in FIG. 11. The auxiliary common line CBL strides the gate-line pull-around lines GLL1 and is electrically connected to the common lines B1 and B3. The auxiliary common line CBL is insulated from the gate-line pull-around lines GLL1 by means of a gate insulation layer GI. Although the auxiliary common line CBL may be formed of an independent conductor, it is preferable to form the auxiliary common line CBL using the same conductive material as the data lines DL. In this case, the auxiliary common line CBL can be simultaneously formed with the data lines DL in the patterning step of the data lines DL. That is, after forming the gate lines and the gate-line pull-around lines GLL1, the gate lines and the gate-line pull-around lines GLL1 are covered with the gate insulation layer GI, contact holes are formed in the gate insulation layer GI at connection portions with the common lines B1 and B3, and the auxiliary common line CBL which is bridged to the common line B1 and B3 is formed at the time of patterning the data lines DL. It is preferable to form the gate wiring pattern and the storage wiring pattern using the same material and on the same layer.

According to this embodiment, the difference in voltage derived from the difference in resistance between the common lines B2 and B3 which supply electricity to the upper and lower storage lines can be alleviated so that the difference in brightness of the pixels which are connected to these upper and lower storage lines can be alleviated whereby the image quality can be enhanced. Further, the upper-side storage lines and the lower-side storage lines may be connected at a point P shown in FIG. 11. Further, due to such a constitution, the feeding pad P-PAD2 formed on the driving circuit mounting region may be eliminated. In this case, the tolerance of arrangement of space for terminals for connection with an external circuit can be increased.

Figure 13:
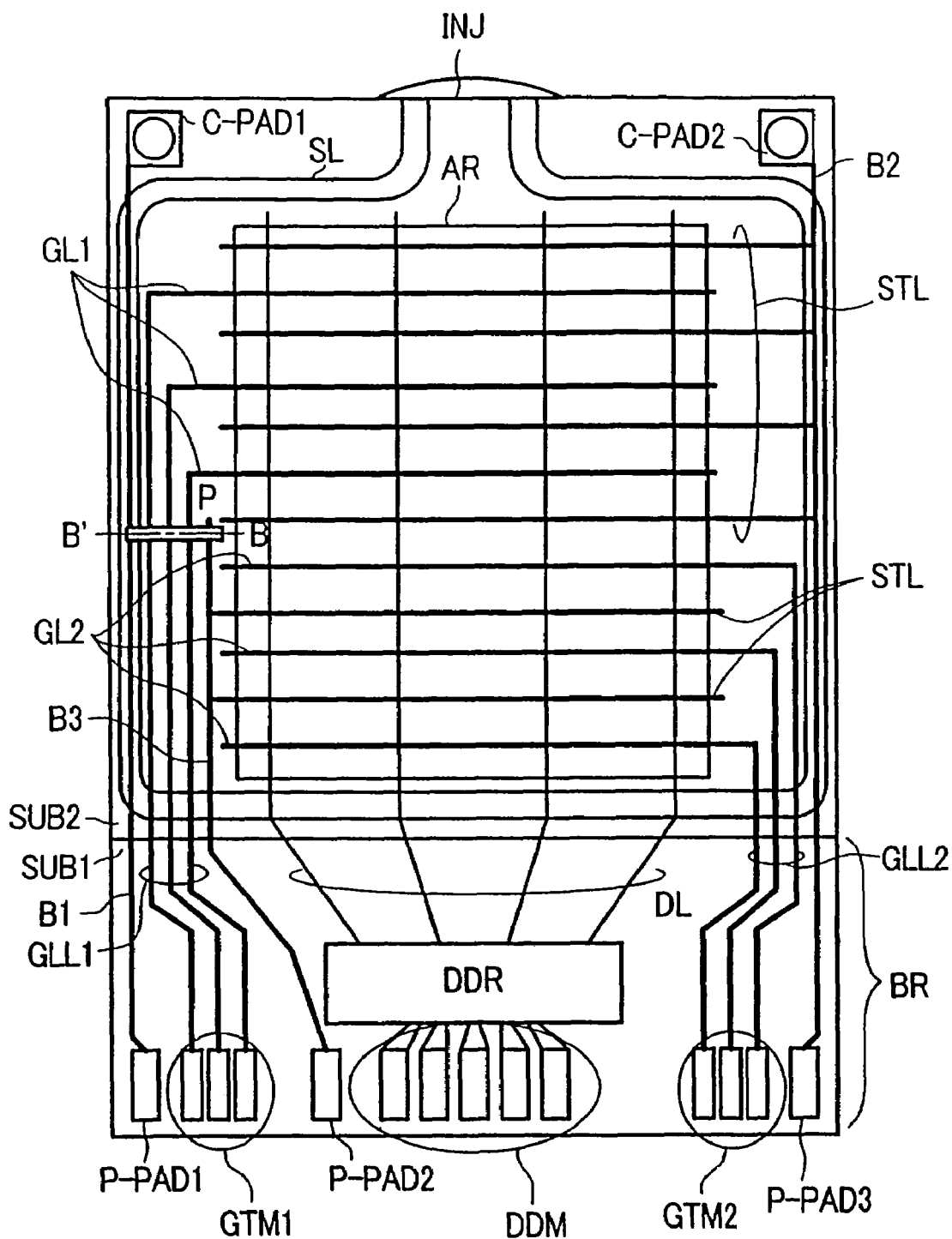
FIG. 13 is a plan view for schematically explaining a liquid crystal display device of the twelfth embodiment of the present invention.

FIG. 13 is a plan view for schematically explaining a liquid crystal display device of the twelfth embodiment of the present invention. This embodiment corresponds to a modification of the embodiment shown in FIG. 2 and can overcome drawbacks similar to the drawbacks which are explained in conjunction with FIG. 11. In the drawing, symbols which are equal to those of the previously mentioned respective embodiments indicate parts having identical functions.

The basic wiring structure shown in FIG. 13 is substantially equal to the wiring structure shown in FIG. 2. That is, in the same manner as FIG. 2, only the data line driving circuit DDR is mounted on the driving circuit mounting region BR. Also in this liquid crystal display device, at the left-side picture frame region of the display region AR as viewed facing FIG. 13, a large number of gate-line pull-around lines GLL1 are provided. At both sides of the gate-line pull-around lines GLL1, the common line B1 which connects the counter electrode connection pad C-PAD1 to the feeding pad P-PAD1 and the common line B3 which connects lower-side storage lines STL in common are arranged. Accordingly, it is difficult for the wiring area of the common line B3 to ensure the sufficient wiring width compared to the common line B2 which is formed on the right-side picture frame region of the display region AR as viewed facing FIG. 13. As a result, there arises the above-mentioned difference in brightness between the pixels in the upper and lower portions of the screen.

In this embodiment, the common line B1 which connects the counter electrode connection pad C-PAD1 to the feeding pad P-PAD1 and the common line B3 which connects the lower-side storage lines STL in common are electrically connected by the auxiliary common line CBL. The counter electrode connection pad C-PAD1 is connected to the feeding pad P-PAD3 arranged at the right-side of the display region AR by way of the counter electrodes formed on the second substrate SUB2. Due to such a constitution, the potential of the lower-side storage lines STL which are connected to the common lien B1 becomes substantially equal to the potential of upper-side storage lines STL. The cross-sectional structure of the auxiliary common line CBL taken along a line B–B' in FIG. 13 is equal to the cross-sectional structure shown in FIG. 12. Further, with respect to other constitutions and advantageous effects, they are similar to those obtained by the liquid crystal display device shown in FIG. 11.

Figure 14:
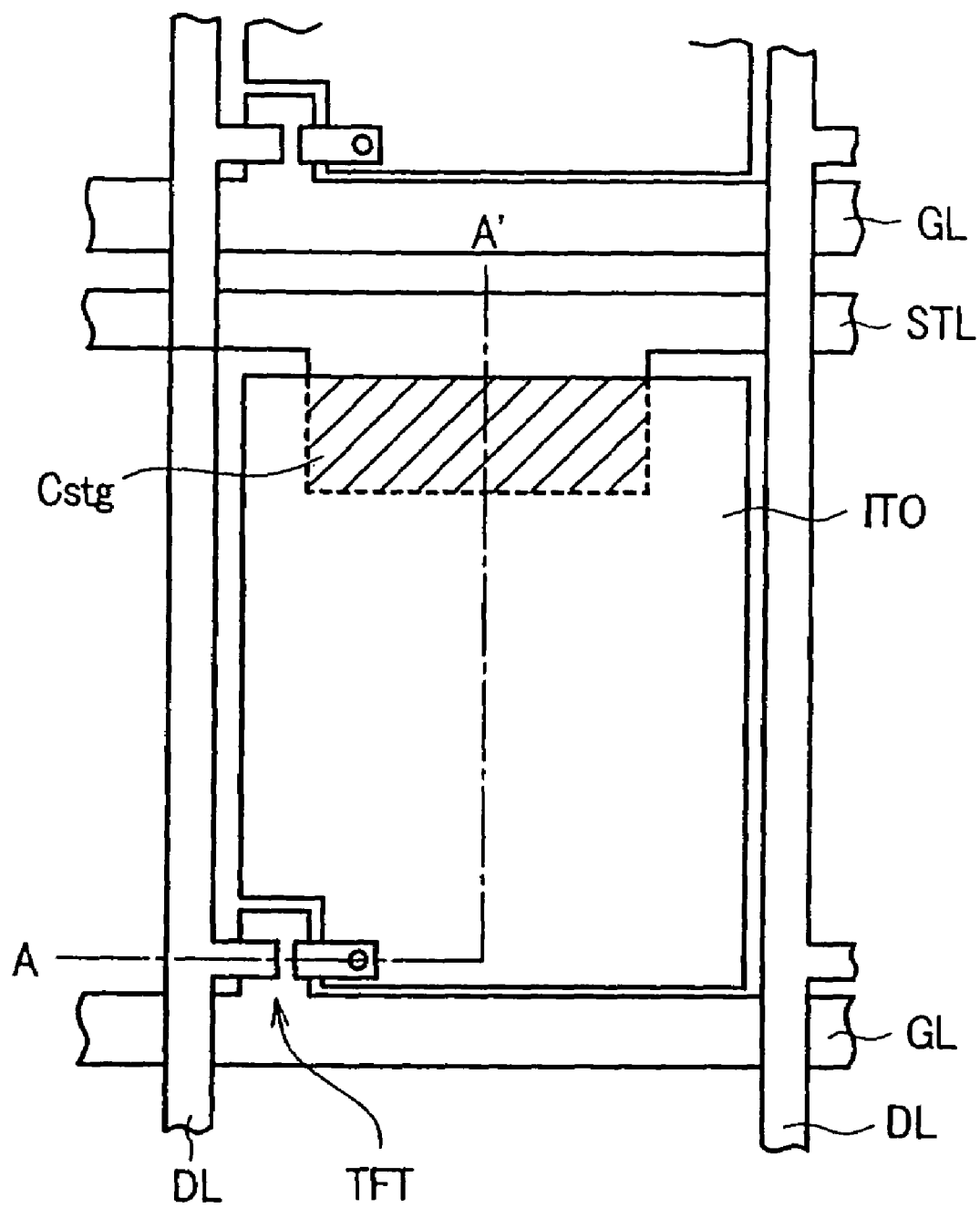
FIG. 14 is a plan view for schematically explaining a constitutional example of the vicinity of one pixel in a first substrate of the liquid crystal display device of the present invention.

FIG. 14 is a plan view for schematically explaining a constitutional example of the vicinity of one pixel on the first substrate of the liquid crystal display device according to the present invention. In the drawing, symbol DL indicates data lines, symbol GL indicates gate lines, symbol STL indicates a storage line, symbol ITO indicates a pixel electrode, symbol TFT indicates a thin film transistor and symbol Cstg indicates a storage capacity. A pixel is formed in a region surrounded by two data lines DL and two gate lines GL. The pixel includes the above-mentioned pixel electrode ITO which is driven by the thin film transistor TFT and a counter electrode not shown in the drawing which is mounted on the second substrate.

The storage line STL is formed close to and parallel to the gate line GL. The storage capacity Cstg is formed at a portion where the storage line STL and the pixel electrode ITO overlap each other. In FIG. 14, although the width of the storage line STL which is served for forming the storage capacity Cstg is enlarged within the pixel, it is not always necessary to enlarge the width of the storage line STL. That is, depending on the characteristics of a dielectric (insulation layer) which is provided between the storage line STL and the pixel electrode ITO, the storage line STL may be formed in a straight line.

Further, the position where the storage capacity Cstg is formed is not limited to a portion shown in the drawing. For example, with respect to a reflection type liquid crystal display device, a partial transmission type liquid crystal display device or a semi-transmission type liquid crystal display device which does not require the consideration of numerical aperture compared to the transmission type liquid crystal display device which requires consideration on numerical aperture, the storage line may be allowed to pass the central portion of the pixel. The storage lines STL are formed in the arrangement explained in conjunction with FIG. 1 to FIG. 13. In FIG. 14, the semiconductor layer SI and the like are omitted.

Figure 15:
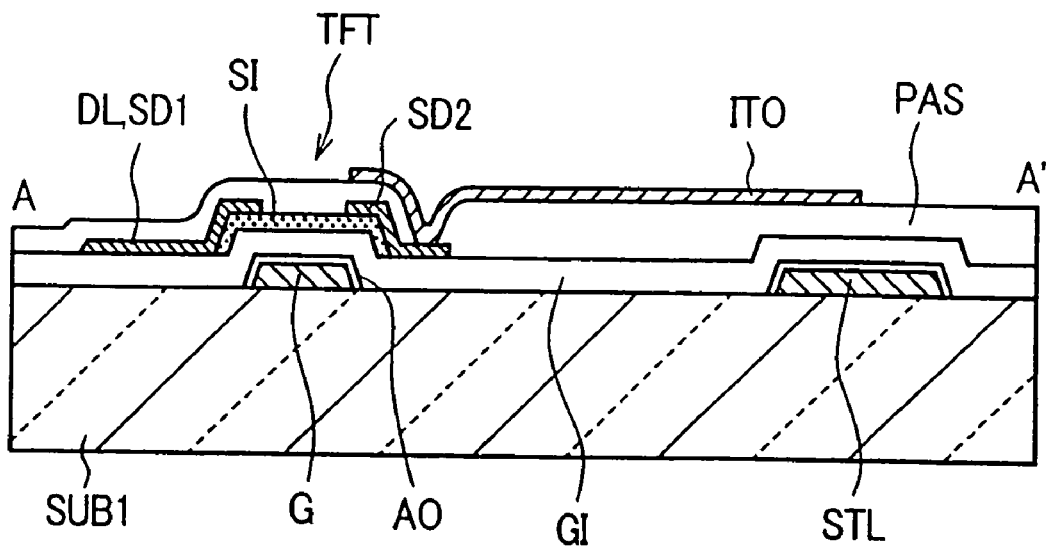
FIG. 15 is a cross-sectional view of the first substrate taken along a line A–A' in FIG. 14.

FIG. 15 is a cross-sectional view of the first substrate taken along a line A–A' in FIG. 14. Symbols which are equal to those of FIG. 14 indicate parts having identical functions. In the drawing, symbol SUB1 indicates the first substrate and the gate electrode G which is extended from the gate line and the storage line STL are formed on the first substrate SUB1. The gate electrode G and the storage line STL are covered with the gate insulation layer GI (for example, SiN), and the thin film transistor TFT which is constituted of the semiconductor layer SI, the drain electrode SD1 and the source electrode SD2 is formed over the gate electrode G. Here, an oxide film AO which is formed by anodization is formed on the surfaces of the gate electrode G including the gate line and the storage line STL. Here, the semiconductor layer SI may be formed of either amorphous silicon (a-Si) or polysilicon (p-Si) to provide the thin film transistor structure which matches characteristics of each material. In this embodiment, the semiconductor layer SI is formed of amorphous silicon (a-Si).

A passivation layer PAS is formed over the gate insulation layer GI including the thin film transistor TFT such that the passivation layer PAS covers the whole surface of the pixel region. The pixel electrode ITO is formed over the passivation layer PAS. Since the liquid crystal display device is a so-called transmission type liquid crystal display device, a transparent conductive film is used as the pixel electrode in such a constitution. The pixel electrode ITO is connected to the source electrode SD2 via a through hole formed in the passivation layer PAS. Further, the pixel electrode ITO extends over the storage line STL and forms the storage capacity Cstg together with the storage line STL.

Figure 16:
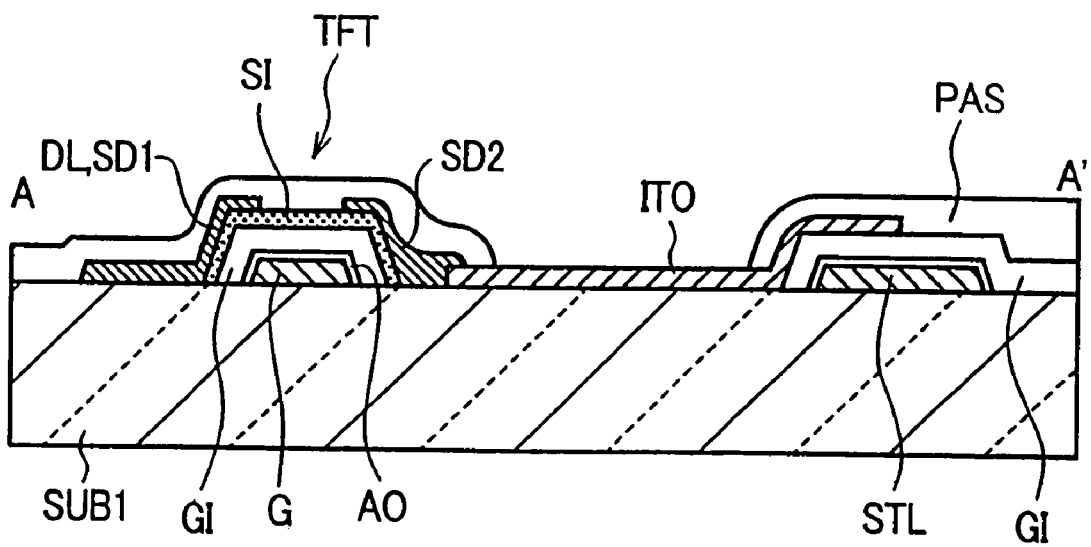
FIG. 16 is a cross-sectional view showing a cross section corresponding to the cross section of the first substrate taken along the line A–A' in FIG. 14 when the present invention is applied to a liquid crystal display device having another structure.

FIG. 16 is a cross-sectional view showing a cross section corresponding to a cross section of the first substrate taken along a line A–A' in FIG. 14 when the present invention is applied to a liquid crystal display device having other structure. Symbols which are equal to those of FIG. 15 indicate parts having identical functions. In FIG. 16, the passivation layer PAS and the through hole are not formed on the pixel region. With respect to other constitutions and advantageous effects, they are similar to those obtained by the liquid crystal display device shown in FIG. 15.

Figure 17:
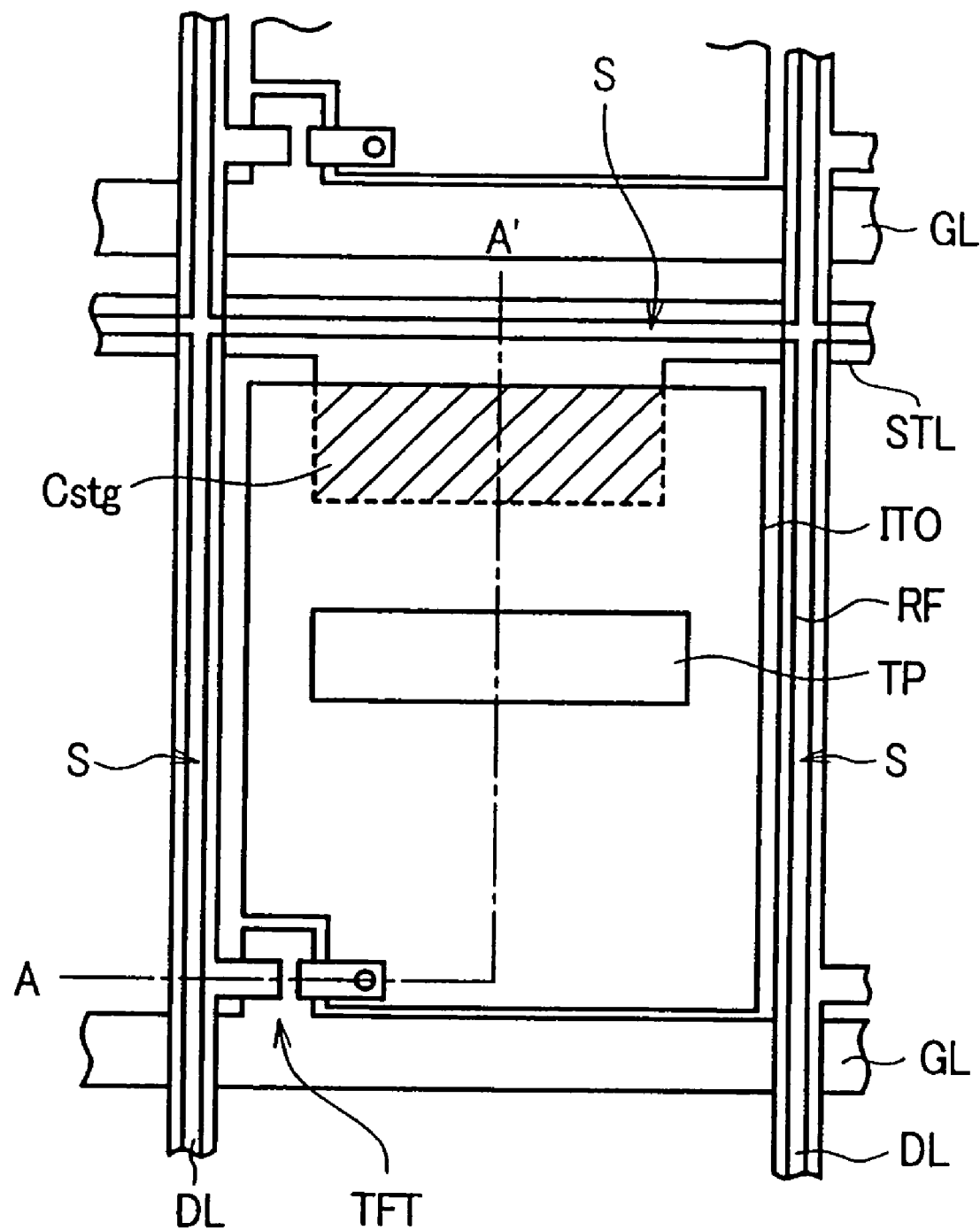
FIG. 17 is a plan view for schematically explaining another constitutional example of the vicinity of one pixel in the first substrate of the liquid crystal display device of the present invention.
Figure 18:
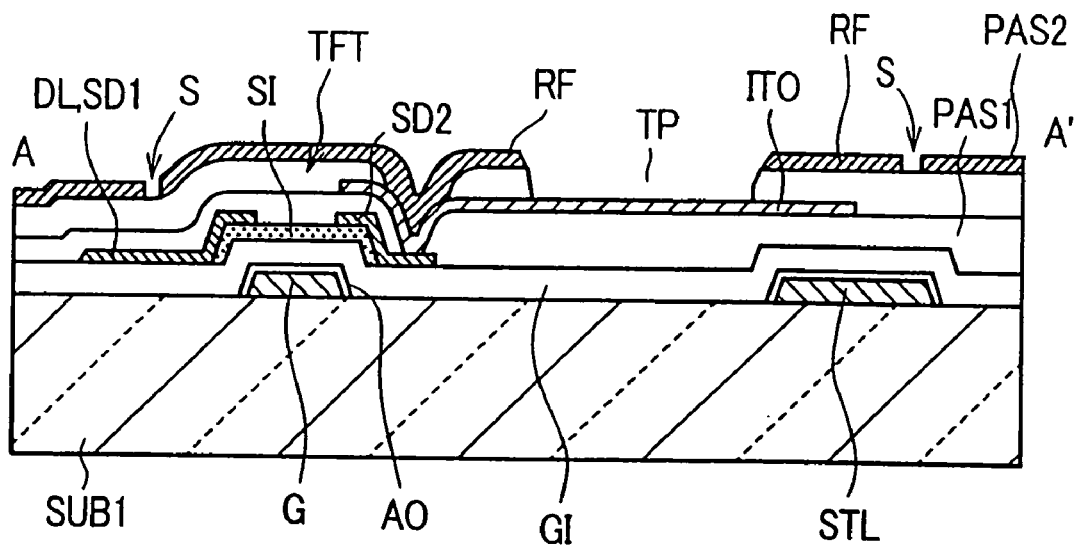
FIG. 18 is a cross-sectional view of the first substrate taken along a line A–A' in FIG. 17.

FIG. 17 is a plan view for schematically explaining another constitutional example of the vicinity of one pixel of the first substrate of the liquid crystal display device according to the present invention. Also in FIG. 17, the illustration of semiconductor layer SI and the like is omitted. Further, FIG. 18 is a cross sectional view of the first substrate taken along a line A–A' in FIG. 17. This liquid crystal display device is a so-called partial transmission type liquid crystal display device. In the pixel structure explained in conjunction with FIG. 14 to FIG. 16, assuming the passivation layer which covers the gate insulation layer GI as the first passivation layer PAS1, a reflection electrode RF is formed over the pixel electrode by way of the second passivation layer PAS2. Here, the second passivation layer PAS2 may be omitted.

The reflection electrode RF is preferably formed of a metal thin film. By removing a portion of the pixel region together with the second passivation layer PAS2 formed below the pixel region, an aperture TP is formed in the reflection electrode RF. When the liquid crystal display device functions as the transmission type liquid crystal display device, light (external light or light from backlight) which enters from the back surface side of the first substrate SUB1 is allowed to transmit or pass through in the direction toward the second substrate. When the liquid crystal display device functions as the reflection type liquid crystal display device, an external light (or light from a so-called front light) which is incident from the second substrate side is reflected on the reflection electrode RF and is irradiated to the second substrate side so as to perform an image display.

When the liquid crystal display device functions simultaneously as the transmission type liquid crystal display device and the reflection type liquid crystal display device, light from the back surface side of the first substrate SUB1 is irradiated to the second substrate side from the aperture TP of the above-mentioned reflection electrode RF and, at the same time, light which is incident from the second substrate SUB2 side is reflected on the reflection electrode RF and is irradiated in the direction toward the second substrate.

As shown in FIG. 17 and FIG. 18, with respect to the reflection electrode RF, a slit S is positioned over the storage line STL and between the reflection electrode RF and the reflection electrode of the neighboring pixel. A slit S is positioned also over the drain line DL and between the reflection electrode RF and the neighboring reflection electrode. By adopting such an arrangement, it is possible to prevent leaking of light from the backlight at a boundary between the pixel and the neighboring pixel at the time of performing the transmission type display so that a favorable contrast can be obtained.

Figure 19:
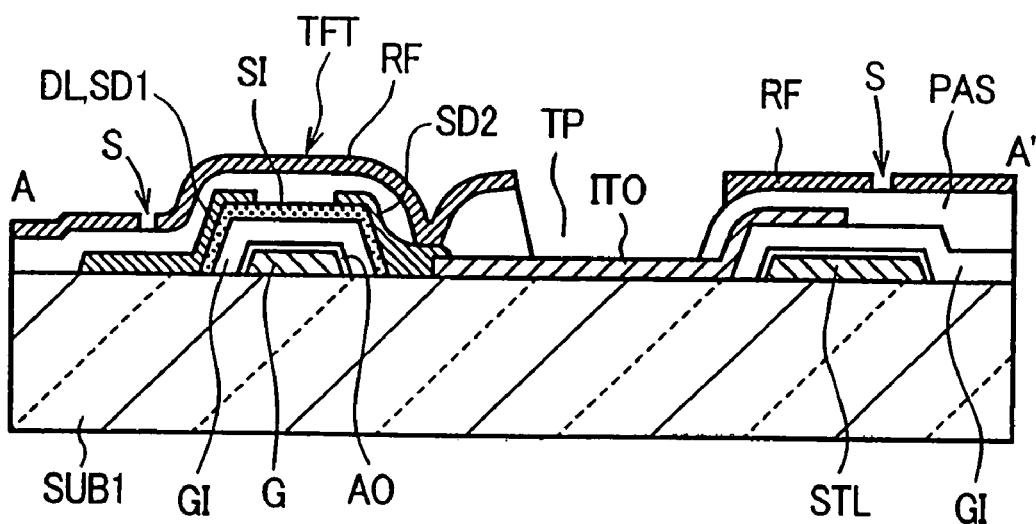
FIG. 19 is a cross-sectional view corresponding to the cross section of the first substrate taken along the line A–A' in FIG. 17 when the present invention is applied to a liquid crystal display device having still another structure.

FIG. 19 is a cross-sectional view showing a cross section corresponding to a cross section of the first substrate taken along a line A–A' in FIG. 17 when the present invention is applied to a liquid crystal display device having still another structure. Symbols which are equal to those of FIG. 17 indicate parts having identical functions. In FIG. 19, the passivation layer PAS is not formed in the pixel region and the pixel electrode ITO is directly formed on the first substrate SUB1. The passivation layer PAS which is formed below the reflection electrode RF is removed at the pixel region. With respect to other constitutions and advantageous effects, they are similar to those obtained by the liquid crystal display device shown in FIG. 17 and FIG. 18 except for that the liquid crystal display device shown in FIG. 19 has no passivation layer PAS2.

Here, besides the above-mentioned liquid crystal display devices of various types, by providing the reflection electrode RF formed of a metal film or the like in place of the pixel electrode ITO formed of the transparent conductive film shown in FIG. 14 to 16, it is possible to provide a reflection type liquid crystal display device. Further, by forming the pixel electrode using semitransparent reflection electrode, the semi-transmission type liquid crystal display device can be constituted. Still further, the present invention is not limited to the relatively miniaturized liquid crystal display device used for the above-mentioned portable terminals or the like. It is needless to say that the present invention is similarly applicable to the liquid crystal display device used as a display device for a notebook type personal computer or other monitoring device. Further, the present invention is not limited to the liquid crystal display device and is applicable to the display device of other type such as an organic EL display, for example.

As has been explained in detail in conjunction with embodiments heretofore, the present invention adopts the constitution in which the gate wiring pattern and the storage wiring patter do not overlap each other and hence, the patterns which have no get-over of wiring can be formed. Further, even when the storage lines are divided into upper and lower groups on the display region, the brightness difference over the entire area of the display region can be attenuated whereby it is possible to provide the display device which is capable of exhibiting high quality display.

What is claimed is:

1. A display device comprising:
   a substrate;
   a plurality of pixels which are arranged in a matrix in a display region and have a storage capacity in each pixel;
   a plurality of gate lines which are arranged in the display region;
   a plurality of data lines which are arranged in the display region and cross the plurality of gate lines; and
   a plurality of storage lines which are arranged in the display region and supply electricity to the storage capacity,
   wherein the substrate includes a first side where a plurality of connection terminals which are connected to an external circuit are provided, a second and third side which are adjacent to the first side and are opposite to each other while sandwiching the display region therebetween,
   the plurality of gate lines include a first gate line, a second gate line which is arranged at a position closer to the first side than the first gate line, a third gate line which is arranged at a position closer to the first side than the second gate line, a fourth gate line which is arranged at a position closer to the first side than the third gate line, a fifth gate line which is arranged at a position closer to the first side than the fourth gate line,
   the first, third and fifth gate line are respectively pulled around to a direction where the first side exists by a first, third and fifth gate-line pull-around line which are provided at the second side,
   the second and fourth gate line are respectively pulled around to a direction where the first side exists by a second and fourth gate-line pull-around line which are provided at the third side, the plurality of storage lines include a first storage line which is arranged between the first gate line and the second gate line, a second storage line which is arranged between the second gate line and the third gate line, a third storage line which is arranged between the third gate line and the fourth gate line, a fourth storage line which is arranged between the fourth gate line and the fifth gate line, the first storage line and the second storage line are connected to each other by a first common line which is provided at the second side, the second storage line and the third storage line are connected to each other by a second common line which is provided at the third side, the third storage line and the fourth storage line are connected to each other by a third common line which is provided at the second side, the first common line and the third common line are arranged between the display region and the first gate-line pull-around line, and the second common line is arranged between the display region and the second gate-line pull-around line.

2. A display device according to claim 1, wherein the first common line and the third common line are electrically connected to each other by a first bridging line which is provided at a layer different from a layer where the first and third common line are provided.

3. A display device according to claim 2, wherein the first bridging line is provided at the second side.

4. A display device according to claim 3, wherein the plurality of gate lines include a sixth gate line which is arranged at a position closer to the first side than the fifth gate line, the sixth gate line is pulled around to the direction where the first side exists by a sixth gate-line pull-around line which are provided at the third side, the plurality of storage lines include a fifth storage line which is arranged between the fifth gate line and the sixth gate line, and the fourth storage line and the fifth storage line are connected to each other by a fourth common line which is provided at the third side.

5. A display device according to claim 4, wherein the second common line and the fourth common line are electrically connected to each other by a second bridging line which is provided at a layer different from a layer where the second and fourth common line are provided.

6. A display device according to claim 5, wherein the second bridging line is provided at the third side.

7. A display device according to claim 1, wherein the plurality of connection terminals include a feeding pad which applies a voltage to the storage line.

8. A display device according to claim 1, wherein the plurality of the gate lines and the plurality of storage lines are formed of the same material at the same layer.

9. A display device according to claim 1, wherein the first gate line and the second gate line are gate lines which are adjacent to each other, the second gate line and the third gate line are gate lines which are adjacent to each other, the third gate line and the fourth gate line are gate lines which are adjacent to each other, and the fourth gate line and the fifth gate line are gate lines which are adjacent to each other.

10. A display device according to claim 1, wherein the display device includes a counter substrate which faces the substrate in an opposed manner and a liquid crystal layer which is sandwiched between the substrate and the counter substrate.

11. A display device according to claim 10, wherein the substrate includes a pixel electrode, the counter substrate includes a counter electrode, and an electric field is applied to the liquid crystal layer by the pixel electrode and the counter electrode.

12. A liquid crystal display device comprising:

a first substrate which includes a pixel electrode;

a second substrate which faces the first substrate in an opposed manner and includes a counter electrode;

a liquid crystal layer which is sandwiched between the first substrate and the second substrate and an electric field is applied to the liquid crystal layer by the pixel electrode and the counter electrode;

a plurality of pixels which are arranged in a matrix in a display region and have a storage capacity in each pixel;

a plurality of gate lines which are arranged in the display region;

a plurality of data lines which are arranged in the display region and cross the plurality of gate lines; and a plurality of storage lines which are arranged in the display region and supply electricity to the storage capacity, wherein the first substrate includes a first side where a plurality of connection terminals which are connected to an external circuit are provided, a second and third side which are adjacent to the first side and are opposite to each other while sandwiching the display region therebetween, the plurality of gate lines include a first gate line, a second gate line which is arranged at a position closer to the first side than the first gate line, a third gate line which is arranged at a position closer to the first side than the second gate line, a fourth gate line which is arranged at a position closer to the first side than the third gate line, a fifth gate line which is arranged at a position closer to the first side than the fourth gate line, the first, third and fifth gate line are respectively pulled around to a direction where the first side exists by a first, third and fifth gate-line pull-around line which are provided at the second side, the second and fourth gate line are respectively pulled around to a direction where the first side exists by a second and fourth gate-line pull-around line which are provided at the third side, the plurality of storage lines include a first storage line which is arranged between the first gate line and the second gate line, a second storage line which is arranged between the second gate line and the third gate line, a third storage line which is arranged between the third gate line and the fourth gate line, a fourth storage line which is arranged between the fourth gate line and the fifth gate line, the first storage line and the second storage line are connected to each other by a first common line which is provided at the second side, the second storage line and the third storage line are connected to each other by a second common line which is provided at the third side, the third storage line and the fourth storage line are connected to each other by a third common line which is provided at the second side, the first common line and the third common line are arranged between the display region and the first gate-line pull-around line, and the second common line is arranged between the display region and the second gate-line pull-around line.

13. A liquid crystal display device according to claim 12, wherein the first common line and the third common line are electrically connected to each other by a first bridging line which is provided at a layer different from a layer where the first and third common line are provided.

14. A liquid crystal display device according to claim 13, wherein the first bridging line is provided at the second side.

15. A liquid crystal display device according to claim 14, wherein the plurality of gate lines include a sixth gate line which is arranged at a position closer to the first side than the fifth gate line, the sixth gate line is pulled around to the direction where the first side exists by a sixth gate-line pull-around line which are provided at the third side, the plurality of storage lines include a fifth storage line which is arranged between the fifth gate line and the sixth gate line, and the fourth storage line and the fifth storage line are connected to each other by a fourth common line which is provided at the third side.

16. A liquid crystal display device according to claim 15, wherein the second common line and the fourth common line are electrically connected to each other by a second bridging line which is provided at a layer different from a layer where the second and fourth common line are provided.

17. A liquid crystal display device according to claim 16, wherein the second bridging line is provided at the third side.

18. A liquid crystal display device according to claim 12, wherein the plurality of connection terminals include a feeding pad which applies a voltage to the storage line.

19. A liquid crystal display device according to claim 12, wherein the plurality of the gate lines and the plurality of storage lines are formed of the same material at the same layer.

20. A liquid crystal display device according to claim 12, wherein the first gate line and the second gate line are gate lines which are adjacent to each other, the second gate line and the third gate line are gate lines which are adjacent to each other, the third gate line and the fourth gate line are gate lines which are adjacent to each other, and the fourth gate line and the fifth gate line are gate lines which are adjacent to each other.

* * * * *